(12) United States Patent
Demaris et al.

(10) Patent No.: US 11,003,630 B2
(45) Date of Patent: May 11, 2021

(54) REMOTE ACCESS OF METADATA FOR COLLABORATIVE DOCUMENTS

(71) Applicant: MICROSOFT TECHNOLOGY LICENSING, LLC, Redmond, WA (US)

(72) Inventors: John Lincoln Demaris, Seattle, WA (US); Christopher F. McNulty, Bothell, WA (US); Kerem Yuceturk, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/236,623

(22) Filed: Dec. 30, 2018

(65) Prior Publication Data
US 2020/0210383 A1 Jul. 2, 2020

(51) Int. Cl.
*G06F 3/00* (2006.01)
*G06F 3/0482* (2013.01)
*G06F 16/178* (2019.01)
*G06F 16/176* (2019.01)
*G06F 16/93* (2019.01)
*G06F 16/16* (2019.01)

(52) U.S. Cl.
CPC .......... *G06F 16/176* (2019.01); *G06F 3/0482* (2013.01); *G06F 16/168* (2019.01); *G06F 16/178* (2019.01); *G06F 16/93* (2019.01)

(58) Field of Classification Search
CPC ..... G06F 3/0481; G06F 16/954; G06Q 10/10; H04L 67/02
See application file for complete search history.

(56) References Cited

U.S. PATENT DOCUMENTS

| | | | |
|---|---|---|---|
| 5,918,226 A * | 6/1999 | Tarumi | G06Q 10/10 |
| 7,899,922 B2 | 3/2011 | Dornbach et al. | |
| 8,359,536 B2 * | 1/2013 | Herpel | G11B 19/025 |
| | | | 715/719 |
| 8,963,952 B2 * | 2/2015 | Nakamori | G06F 21/6218 |
| | | | 345/629 |
| 8,965,847 B1 | 2/2015 | Chang | |
| 9,367,646 B2 | 6/2016 | Branton | |
| 10,037,339 B1 | 7/2018 | Kleinpeter et al. | |

(Continued)

OTHER PUBLICATIONS

"Business Document Metadata Service Location Version 1.0", Retrieved from: http://docs.oasis-open.org/bdxr/BDX-Location/v1.0/BDX-Location-v1.0.html ,Retrieved On: Jan. 9, 2019, 15 Pages.

(Continued)

*Primary Examiner* — Jordany Nunez
(74) *Attorney, Agent, or Firm* — NovoTechIP International PLLC

(57) ABSTRACT

A system and method for management of remote metadata-based activities while accessing electronic content via a local application. The system is configured to receive a user input that triggers a signal for communicating with a remote server. The remote server can provide options to the client system that are related to or based on metadata for the currently viewed electronic content. The disclosed system and method significantly improve efficiency and ease-of-use for document development and synchronization systems.

20 Claims, 14 Drawing Sheets

(56) References Cited

U.S. PATENT DOCUMENTS

| | | | |
|---|---|---|---|
| 2008/0040758 A1* | 2/2008 | Beetcher | H04N 21/233 |
| | | | 725/81 |
| 2009/0006936 A1 | 1/2009 | Parker et al. | |
| 2009/0313256 A1 | 12/2009 | Konduri et al. | |
| 2009/0327405 A1 | 12/2009 | Fitzgerald et al. | |
| 2011/0154219 A1* | 6/2011 | Khalatian | G06F 3/1462 |
| | | | 715/751 |
| 2015/0100547 A1 | 4/2015 | Holmes-Higgin et al. | |
| 2015/0317049 A1* | 11/2015 | Miura | G06F 3/0482 |
| | | | 715/843 |
| 2016/0065672 A1 | 3/2016 | Savage et al. | |
| 2017/0235537 A1* | 8/2017 | Liu | G06F 3/1454 |
| | | | 715/759 |
| 2018/0267989 A1 | 9/2018 | Von Muhlen et al. | |
| 2018/0373484 A1* | 12/2018 | Handrigan | G06F 16/9038 |

OTHER PUBLICATIONS

"Microsoft SharePoint Workspace", Retrieved from: https://en.wikipedia.org/wiki/Microsoft_SharePoint_Workspace, Retrieved Date: Jan. 9, 2019, 3 Pages.

"Overview of Storage Gateway", Retrieved from: https://docs.cloud.oracle.com/iaas/Content/StorageGateway/Concepts/storagegatewayoverview.htm, Retrieved Date: Jan. 9, 2019, 7 Pages.

"Using Amazon WorkDocs Drive", Retrieved from: https://docs.aws.amazon.com/workdocs/latest/userguide/workdocs_drive_help.html#drive_install, Retrieved Date: Jan. 9, 2019, 7 Pages.

"International Search Report and Written Opinion Issued in PCT Application No. PCT/US2019/068211", dated Mar. 3, 2020, 14 Pages.

* cited by examiner

REMOTE ACCESS OF METADATA FOR COLLABORATIVE DOCUMENTS

BACKGROUND

Cloud storage accounts allow users to store their electronic content items or files in an online storage account that can be accessed from any computing device with a network connection. Some more well-known examples of cloud storage service providers include Microsoft OneDrive®, Google Drive®, DropBox®, and Box®. Through these types of services, users can upload content items such as pictures, songs, documents, and other electronic content from a computing device to an online storage account. These items can later be accessed from different computing devices. In some cases, such as Microsoft's OneDrive®, the service offers a means of storing, syncing, and sharing a wide variety of file types with other people and across multiple computing devices, as well as the possibility of synchronizing system settings, visual customizations, themes, app settings and browser tabs, history and saved passwords for different devices.

Once content has been stored in the online storage account, users are able to access their content items. However, synchronizing the content items themselves can be time consuming. As one example, numerous content items can include large sets of data about the content item itself (e.g., metadata). Traditional content item synchronization methods are designed to convey the entirety of the content items (including metadata), which can lead to longer synchronization sessions and local memory storage. Thus, there remain significant areas for new and improved ideas for reducing time lags during synchronization of data as well as improving the experience for users to interact with data about a given document.

SUMMARY

A content management system accessing collaborative document actions, in accord with a first aspect of this disclosure, includes a processor and computer readable media including instructions which, when executed by the processor, cause the processor to receive, at a first client system, a first uniform resource identifier (URI) associated with a first collaborative document being synchronized with the first client system, and receive, via a native application executing on the first client system in connection with a local instance of the first collaborative document, a first user input to display a first menu of actions for the local instance. In addition, the instructions cause the processor to retrieve, via a network, a first available action manifest corresponding to the first URI in response to the first user input, where the first available action manifest includes a first action specification identifying a first collaborative document action available via a remote system, as well as dynamically generate a menu item for the first collaborative document action and displaying the menu item with the first menu in response to retrieving the first available action manifest. Furthermore, the instructions cause the processor to receive a second user input indicating a user selection of the menu item, and then retrieve, in response to the second user input and based on the first action specification, first instructions from the remote system for rendering a user interface to perform the first collaborative document action for the first collaborative document. The instructions also cause the processor to execute the first instructions to display an action user interface on the first client system for the first collaborative document, receive a third user input via the action user interface, and transmit a command from the first client system to the remote system to perform the first collaborative document action on the first collaborative document, in response to the third user input.

A method for accessing collaborative document actions, in accord with a second aspect of this disclosure, includes receiving, at a first client system, a first uniform resource identifier (URI) associated with a first collaborative document being synchronized with the first client system, as well as receiving, via a native application executing on the first client system in connection with a local instance of the first collaborative document, a first user input to display a first menu of actions for the local instance. In addition, the method includes retrieving, via a network and in response to the first user input, a first available action manifest corresponding to the first URI, where the first available action manifest includes a first action specification identifying a first collaborative document action available via a remote system, and then, in response to retrieving the first available action manifest, dynamically generating a menu item for the first collaborative document action and displaying the menu item with the first menu. Furthermore, the method includes receiving a second user input indicating a user selection of the menu item, and then, in response to the second user input and based on the first action specification, retrieving first instructions from the remote system for rendering a user interface to perform the first collaborative document action for the first collaborative document, and then executing the first instructions to display an action user interface on the first client system for the first collaborative document. The method also includes receiving a third user input via the action user interface and, in response to the third user input, transmitting a command from the first client system to the remote system to perform the first collaborative document action on the first collaborative document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
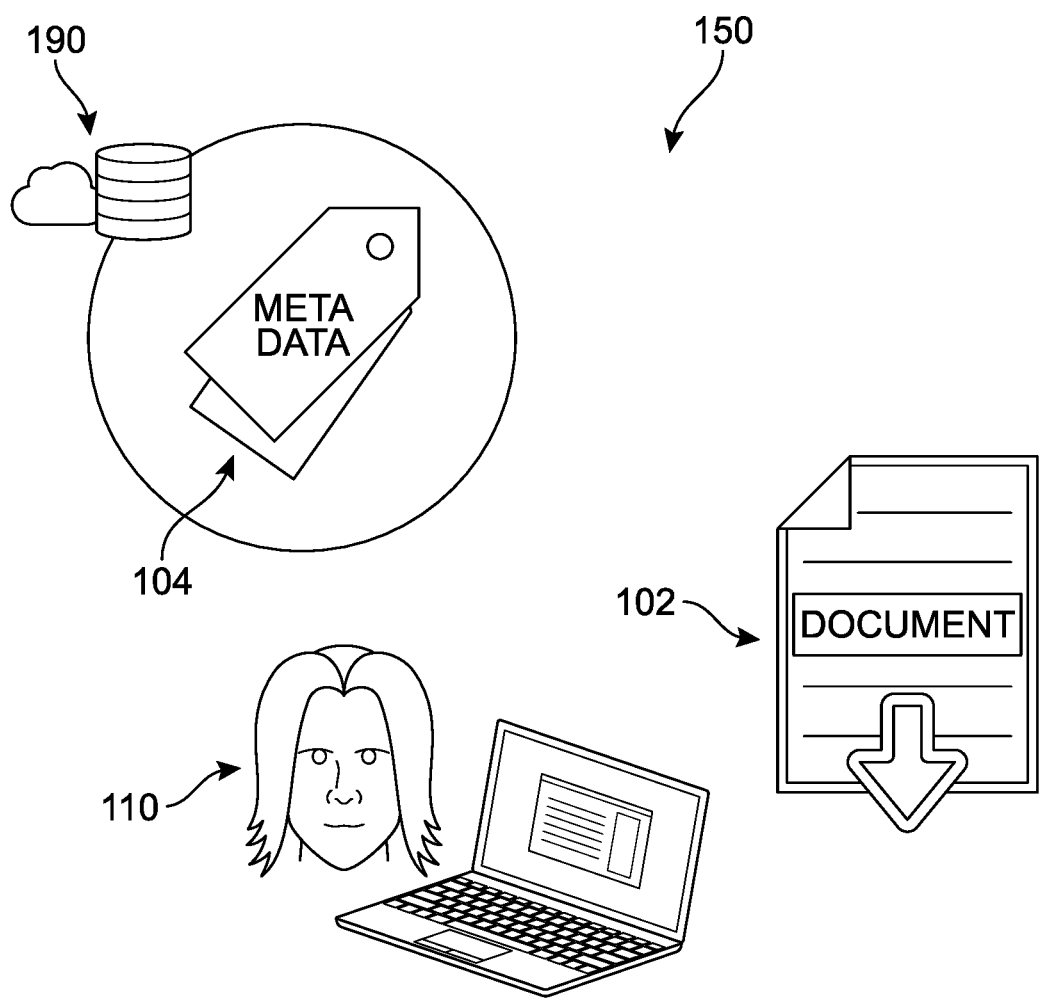
FIG. 1A and FIG. 1B are conceptual illustrations of an implementation of a content synchronization environment.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As a general matter, computing systems frequently share and access information from a cloud computing (or other remote server) environment. For example, some computing systems store files on a cloud computing data storage system. However, during authoring and editing of a document, these same files may also be stored on a local disk by the application. Similarly, as discussed in further detail below, some systems have applications that support document collaboration, such as merge, sharing, co-authoring, and other functionalities or capabilities. In some cases, these systems can rely on a synchronization engine (or "sync engine") that is responsible for detecting and synchronizing changes to files and folders between a local disk and a cloud storage system. In order to accomplish this, the sync engine can track the state of both the file that is stored on the disk and that stored in the cloud, and reconcile those states when it receives information that something has changed. As an example, if a file is edited on a local disk, the sync engine may detect that change, realize it needs to send the change to the cloud, transmit the change, wait for the cloud to respond, and then update its local state information to indicate that the change has been made. In cases where a file is the product of or subject to collaboration, additional and evolving metadata can be associated with the file. In some implementations, the system can be configured to maintain and communicate a set of collaborative metadata for each file. In other words, each file may have or be linked to metadata about the file. Such "collaborative metadata" for each file may be used in part to help maintain the various versions of the file, as well as provide important information about status, workflow tasks, or other aspects of the file. However, maintaining an up-do-date synchronization of the file as well as its associated collaborative metadata can cause delays during synchronization as well as consume significant amounts of computational resources. In order to help minimize the impact of the synchronization process on system and network resources, the following disclosure proposes a paradigm in which collaborative metadata for a file is essentially separated from the file during synchronization and subsequent user access of the file on a client device. In other words, while users download and/or access files via client device applications and these files continue to be synchronized with a cloud storage system, the collaborative metadata remains in a remote location (e.g., outside of the local device). In the event a user initiates an action in the file that requires access of the collaborative metadata, the proposed content management system (CMS) can respond by providing a portal or other network interface on the local device via which the user can directly access the collaborative metadata that is stored in the cloud. The synchronization process for files thus occurs without requiring transference of large, costly amounts of collaborative metadata to the client device. By enabling users to 'reach out' to the cloud for file metadata on an as-needed basis, the system as a whole can operate more smoothly and efficiently.

Generally, a content management system (CMS) refers to a system by which a user can store content items, as well as perform a variety of content management tasks, such as retrieve, modify, browse, and/or share the content items, and enable a user to access the content from multiple client devices. Generally, a user can interact with a CMS through one or more client devices that are connected to a network. A CMS can support connections from a variety of different client devices, such as desktop computers, mobile computers, mobile communications devices (such as mobile phones, smart phones, tablets, etc.), smart televisions, gaming devices, set-top boxes, and/or any other network enabled computing devices. A CMS can be configured to accept connections from and interact with multiple client devices concurrently. Typically, a user engages with a CMS through interaction with a client-side application that is installed on the client's device, or via a third-party application, such as a web-browser application, and is configured to communicate with the CMS.

Furthermore, as an example, the terms "electronic content item" or "content item" can include any digital data that may be presented (e.g., visually or audibly presented), including but not limited to an electronic document, a media stream, a web page, a hypertext document, an image, digital video or a video recording, digital audio or an audio recording, animation, a digital message, a markup language document, such as a HyperText Markup Language (HTML) or eXtensible Markup Language (XML) document, a form having blank components to accept entered data, or data describing the application of a GUI, and other digital data. In addition, "items" can include any folder, file, directory, or data object on an electronic device. As one example, items can refer to directory "folders" that can include documents, photos, music files, and video files.

Furthermore, the terms "software application", "software", or "application" generally refer to a computer program that performs useful work, often unrelated to the computer itself. Some non-limiting examples of software applications include word processors, spreadsheets, accounting systems, and telecommunication programs, as well as gaming software, utility and productivity tools, mobile applications, presentation graphics, and other productivity software. These are non-limiting examples, and any other electronic content editing or collaboration application may benefit from the disclosed implementations. Specific references to a software application by name throughout this description should not therefore be understood to limit the use of the proposed systems and methods.

In addition, the following disclosure will make references to a document 'workflow'. Workflow may be generally described as a series of tasks that produce an outcome. In the context of following disclosure, workflow can for example refer to the automated or substantially automated movement of documents or items through a sequence of actions or tasks that are related to a business or other collaborative process. Workflows are frequently used to manage common business processes within an organization by enabling the organization to attach business logic to documents or items in a shared content management system. Generally, business logic refers to a set of instructions that specifies and controls the actions that happen to a document or item.

Workflows typically streamline the cost and time required to coordinate common business processes, such as project approval or document review, by managing and tracking the human tasks involved with these processes. For example, in a Microsoft SharePoint® site, a workflow can be added to a document library that routes a document to a group of people for approval. When the document author starts this workflow on a document in that library, the workflow creates document approval tasks, assigns these tasks to the workflow participants, and then sends e-mail alerts to the participants with task instructions and a link to the document to be approved. While the workflow is in progress, the workflow owner (in this case, the document author) or the workflow participants can view a 'Workflow Status' panel to identify which participants have completed their workflow tasks. As workflow participants complete their workflow tasks, the workflow ends, and the workflow owner is automatically notified that the workflow has completed. In other words, workflows are commonly used to drive processes and manage the lifecycle around files in a document repository. Thus, workflows can facilitate the management process around collaborative documents.

Generally, it may be understood that such workflows rely heavily on metadata that is associated with a file. As many users continue to open and access documents on client device applications, rather than web-based applications, the following implementations describe a mechanism by which collaborative metadata about the document's workflow status or history may remain in the cloud storage system. The following systems and methods offer users the ability to quickly access this remote collaborative metadata while working locally. In other words, work occurring on a client device for a document (e.g., as a local instance) can remain coupled with the collaborative metadata for the document via links available during document access, allowing users to continue to manage workflows and other resultant information about the document. In some implementations, a form can be generated that contains some or all the metadata that is determined to be of relevance for the document, depending on its configuration. That form can for example contain one or more fields, each field mapping to one piece of metadata, as will be discussed in greater detail below.

Figure 1B:
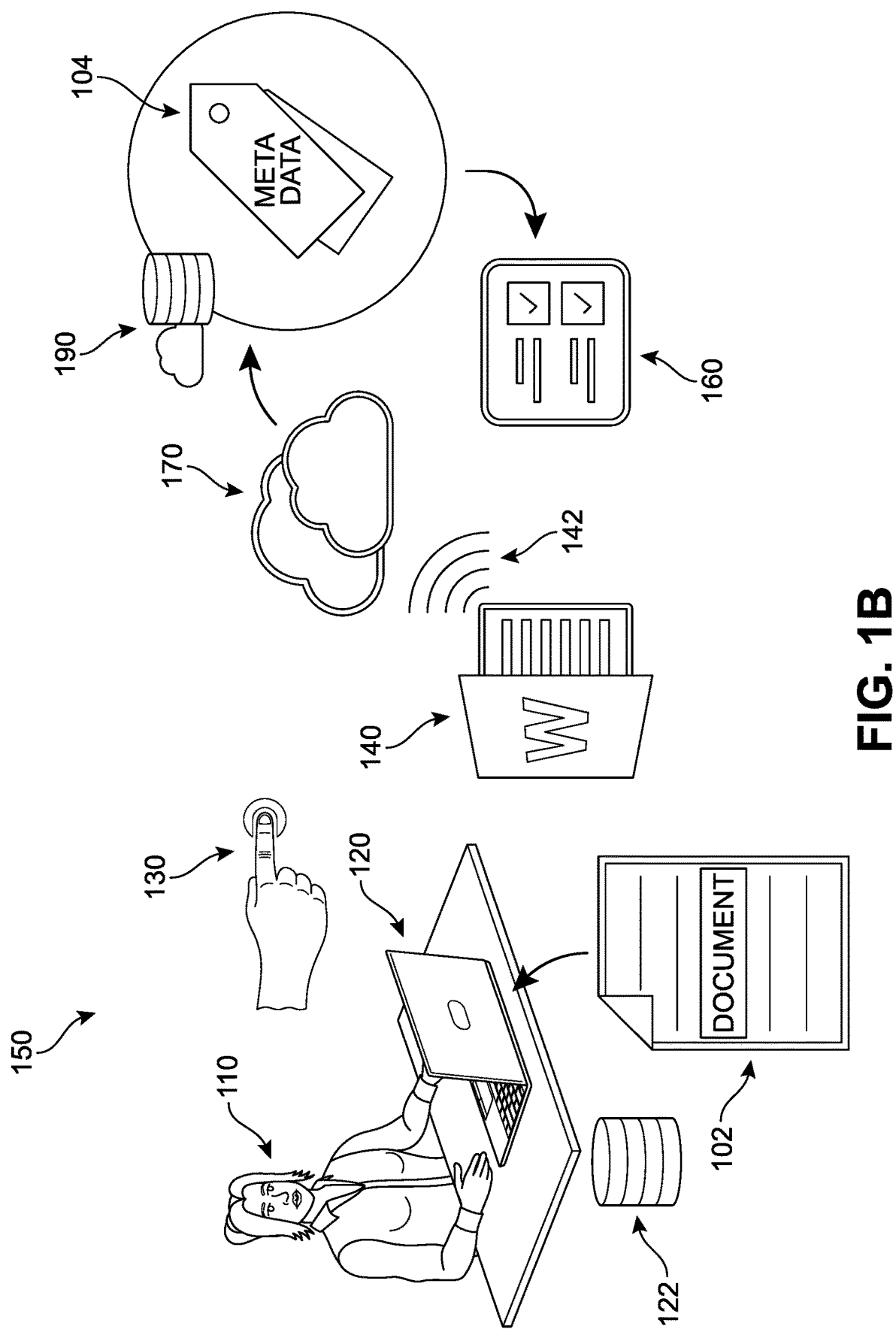
Figure 2A:
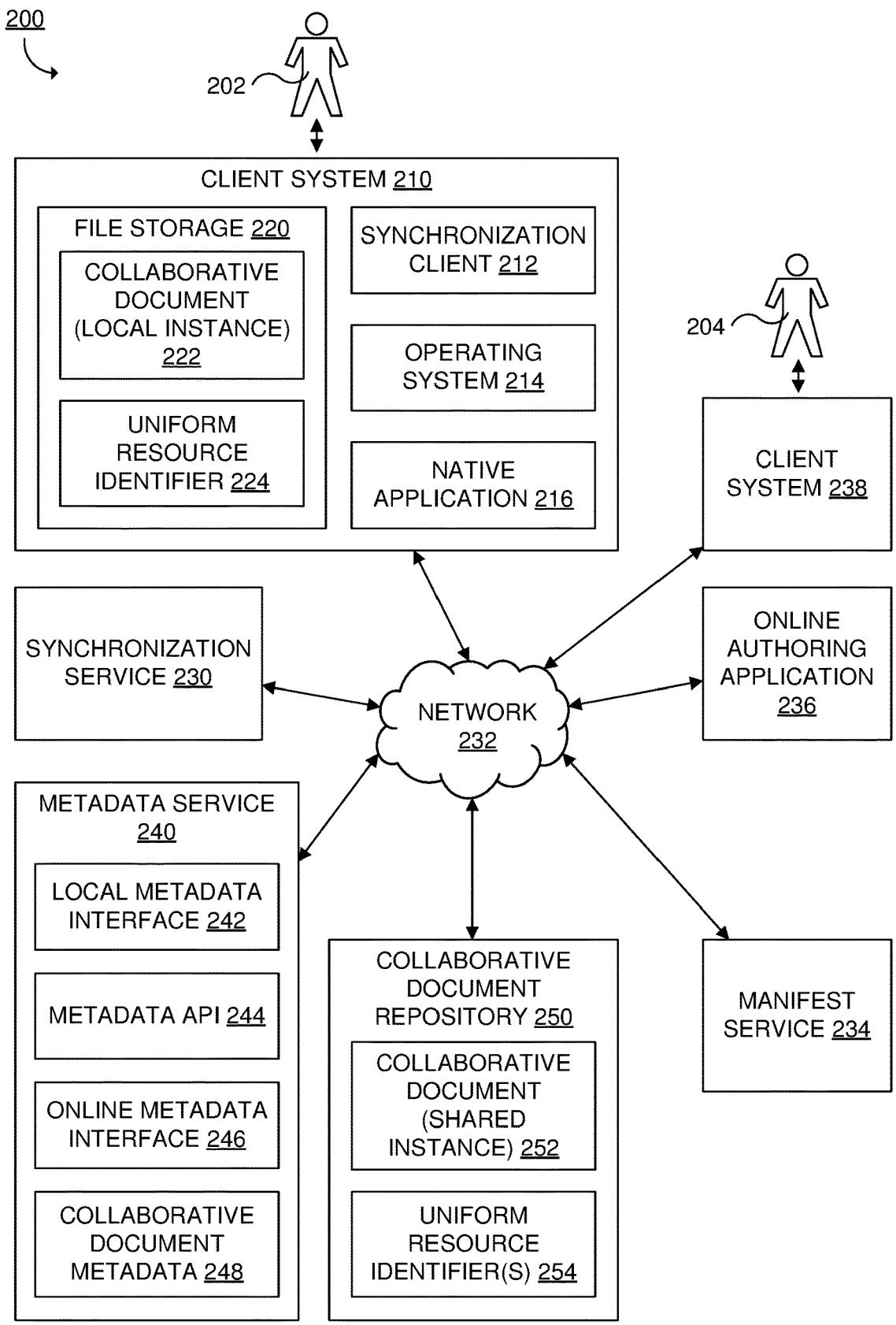
FIGS. 2A and 2B are conceptual diagrams illustrating an implementation of a distributed computing environment architecture for managing content synchronization and metadata.
Figure 2B:
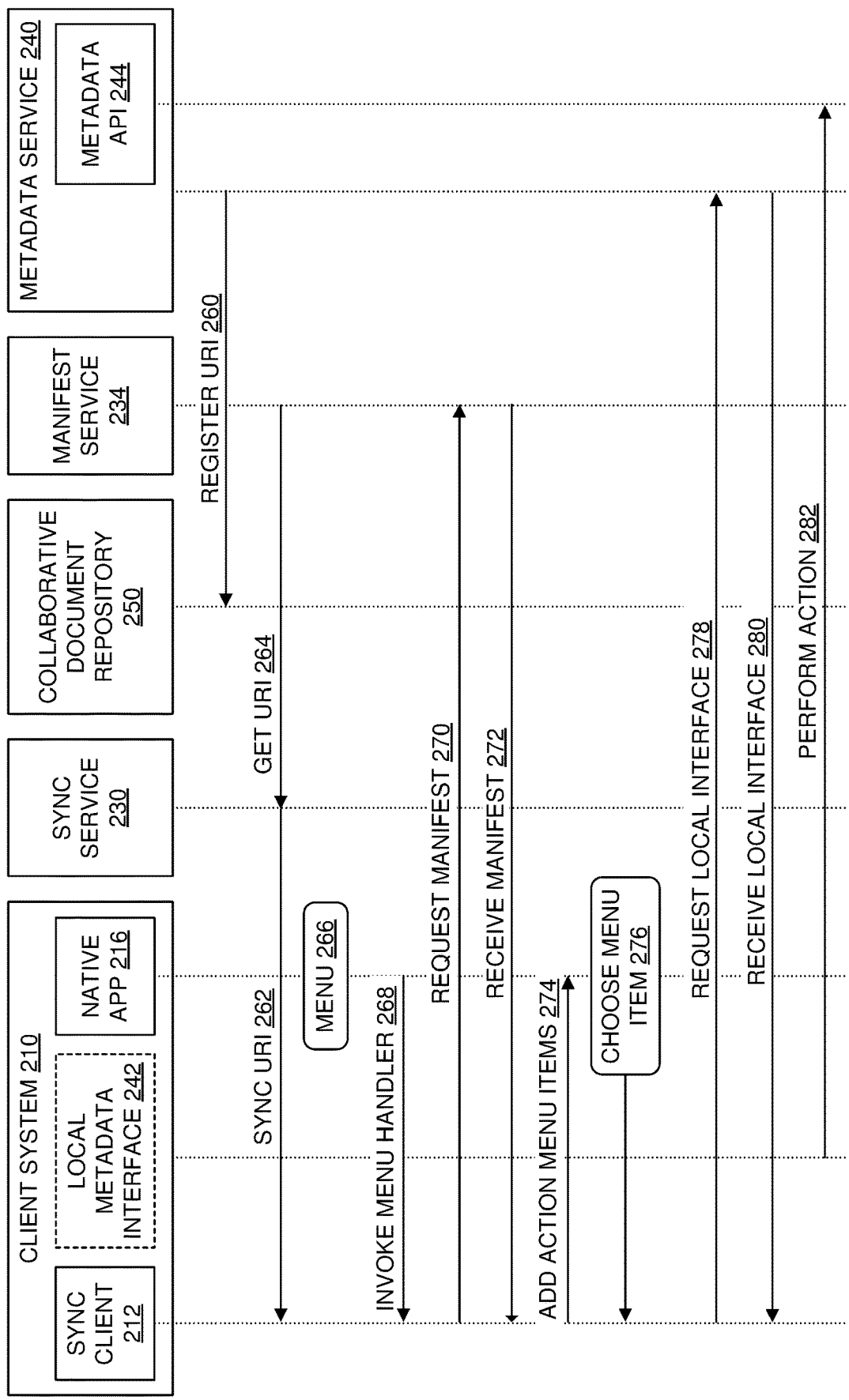

In order to better introduce the systems and methods to the reader, FIGS. 1A and 1B present a high-level example of a representative computing environment ("environment") 150 for implementing an electronic content synchronization management system (illustrated schematically in FIGS. 2A and 2B). In different implementations, the environment 150 can include one or more computing device end-users, or simply "users". One or more users can interact with or manipulate data presented via a user device. The various features and activities illustrated in FIGS. 1A and 1B are described generally, with further details and examples presented in connection with later figures.

As an example, a first user 110 is shown in FIG. 1A. In this case, the first user 110 is accessing a synchronization client application ("synchronization client") 100 on a first device 120. The first device 120 may be a personal computer such as a desktop or laptop computer, a mobile device, or any other computer system having a file system. The first device 120 executes an operating system such as Microsoft Windows®, Mac OS®, Unix®, or other operating system, and includes memory, storage, a network interface, and other computer hardware not illustrated in FIG. 1A for purposes of simplicity. The first device 120 creates, modifies, and/or deletes files on its storage system via its operating system. In addition, as described further below, the first device 120 includes one or more synchronized folders. In FIG. 1A, only one device is shown, but any number of devices may be sharing synchronized folders via the synchronization service. For example, the first device 120 can be connected to a server, other devices, and/or an online or cloud-based computing document repository ("cloud repository") 190. As first user 110 adds or modifies electronic content via first device 120, various content or files may be updated or saved in the cloud storage through a network connection.

In different implementations, client computing devices may include traditional client-type devices, as well as desktop computer-type devices, mobile-type devices, special purpose-type devices, embedded-type devices, and/or wearable-type devices. As an example, the client computing devices can include computer navigation type client computing devices such as satellite-based navigation systems including global positioning system (GPS) devices and other satellite-based navigation system devices, telecommunication devices such as mobile phones, tablet computers, mobile phone tablet hybrid, personal data assistants (PDAs), laptop computers, other mobile computers, wearable computers, implanted computing devices, desktop computers, personal computers, automotive computers, network-enabled televisions, thin clients, terminals, game consoles, gaming devices, work stations, media players, personal video recorders (PVRs), television set-top boxes, digital video recorders (DVRs), cameras, integrated components for inclusion in a computing device, appliances, or any other sort of computing device configured to receive user input.

In this example, the first device 120 allows the first user 110 to create, modify, and delete files on the client's local file system, and for those actions to be synchronized with versions of the same files on a host system and/or on one or more other client computers. In some implementations, the user may create a folder and designate it for synchronization. The file's contents are managed in part by synchronization client 100 to maintain the desired frequency or level of synchronization. Generally, users can create a shared synchronized folder either through a native control for synchronization client 100, or via a web server.

In FIG. 1A, the synchronization client 100 can be understood to provide a UI that is configured to permit the first user 110 to select a folder or content to be accessed or shared. Thus, the first user 110 is using first device 120 to receive or synchronize one or more electronic content available in cloud repository 190. For purposes of this specific example, the electronic content set includes a first electronic content item ("first item") 102 associated with a first collaborative metadata content ("first metadata") 104. The first item 102 includes the primary content comprising the document itself, while the first metadata 104 includes information about the document.

In FIG. 1A, the first user 110 is adding or updating the file corresponding to the first item 102 to a local synchronized folder on first device 120 via the synchronization client 100. The operating system can send a message to indicate a change has occurred to the synchronized folder, as well as the location (path) of the folder or file within the folder where the change has occurred. As the folder is synchronized, data associated with each item is transmitted to and/or from the cloud storage service 190.

In many cases, the average user will remain unaware of the separation of data from metadata during the synchronization process. As shown in FIG. 1B, the first user 110 proceeds with accessing the document (first item 102) via a native application 140 located or otherwise associated with computing resources 122 of first device 120. In different implementations, the architecture can include at least one network, including but not limited to public networks such as the Internet, private networks such as an institutional and/or personal intranet, and/or some combination of private and public networks.

The first user 110 may perform work or make changes to the document. At some point during their access of the native application 140, the first user 110 can initiate an action associated with the first item 102 that requires access to metadata for the document. Because this metadata is not available locally, when the first user 110 provides some input (here shown as a trigger 130) initiating a request for access to the metadata, in some implementations, the native application 140 can generate a signal 142 that is transmitted to a CMS 170 or other cloud-based service. The service can retrieve the metadata (second item 104) from the cloud storage service 190 and present a web-based interface 160 on the first device 120 for the first user 110 to view and/or interact with. In other implementations, the native application 140 can send a signal to some other application of the client system in order to initiate a communication session with the remote metadata. The first user 110 is then able to easily access metadata-based content regardless of the content's synchronization status on the first device 120.

Accordingly, the present disclosure provides a plurality of technical advantages including but not limited to: implementation of a synchronization process that can interface with a plurality of native applications, ability to separate synchronization of document content data from metadata for the document, more efficient operation of a processing device executing data transfer across applications (e.g., saving computing cycles/computing resources), more efficient communication between devices during file synchronization (e.g., less renegotiation between devices to synchronize file data), ability to work with devices in a variety of form factors, extensibility when working with file data for synchronization including an ability to modify metadata associated with a file being synchronized without requiring the download or transfer of the metadata content, and a reduction in latency for synchronization between devices and file transfer, among other examples.

In order to provide greater clarity with respect to the disclosed implementations, an example of a content management system ("system"), comprising a first client system 210 (associated with a first user 202), a second client system 238 (associated with a second user 204), and a synchronization service 230, is presented with reference to the sequence of FIGS. 2A and 2B. It is noted that all features and functions described elsewhere in this description may be implemented at least by the system described in FIGS. 2A and 2B.

In FIG. 2A, one implementation of the synchronization service 230 for managing document synchronization and collaborative metadata content is depicted. In some implementations, the synchronization service 230 may be in communication with various modules, such as other services and repositories, including a metadata service 240, a manifest service 234, and/or a collaborative document repository 250. While these modules are shown as separate from the synchronization service 230 in the implementation of FIG. 2A, it should be understood that in other implementations one or more of these modules may be part of or incorporated within the synchronization service 230 itself.

In different implementations, the various components of the system 200 can receive and/or share information via at least one wired or wireless network interface that enables communications with other modules and with network-based applications over a network 232. Examples of a network interface include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Some examples of network 232 include a local area network (LAN), a wide area network (WAN) such as the Internet, a personal area network (PAN), and/or a combination of communication networks.

In order to provide greater clarity to the reader, the second client system 230 is included to illustrate one mechanism by which document workflows and collaboration may occur. In FIG. 2A, the second user 204 can access and/or interact with a shared instance of a collaborative document 252 (for example on an online authoring or other web-based application 236) via network 232. The online authoring application 236 represents an example of a network-based application, which in some instances may also be referred to as "cloud" applications or services. Network-based applications are generally accessible by a computing device over network 232, may be configured to perform data processing and/or data hosting operations, and may provide data for metadata-based activities and tasks (e.g., workflows). In different implementations, such network-based applications may include any type of network-accessible applications or services, such as database applications, social networking applications, messaging applications, financial services applications, news applications, search applications, productivity applications, cloud storage applications, file hosting applications, etc. Some non-limiting examples of such applications include a network-accessible SQL (structured query language) database, Salesforce.com™ Facebook®, Twitter®, Instagram®, Yammer®, LinkedIn®, Yahoo!® Finance, The New York Times® (at www.nytimes.com), Google search, Microsoft® Bing, Google Docs™ Microsoft® Office 365, Dropbox™, etc. Although FIG. 2A shows one network-based application, any number of network-based applications may be accessible over network 232.

The collaborative document 252, stored in a collaborative document repository 250, can include the electronic content for the document itself. In some implementations, the metadata and corresponding metadata-based action options for the collaborative document 252 may be stored in a separate module (here, metadata service 240). The metadata service 240 can provide the second user 204, via the second client system 238, with an online metadata interface 246 for engaging with various workflow options or other metadata-based activities for the selected document. In some implementations, the changes or other information generated in conjunction with the metadata-based activities can be recorded in a collaborative document metadata store 248.

In different implementations, collaborators of a document can choose to access the document as a local (native application) instance or a remote or shared (web-based) instance. As an example, the first user 202 may be understood to be accessing the collaborative document 252 as a local instance 222 from a file storage 220 following a synchronization session. The first client system 210 may include any of the features described for the synchronization client application 100 and first device 120 in FIGS. 1A and 1B above. The local instance 222 can be generated via communication between the synchronization service 230 and a synchronization client 212 associated with a client operating system 214 of the first client system 210, which can synchronize the shared instance of the collaborative document 252 with the local instance 222 at various times. In some implementations, the first user 202 can opt to access or interact with the local instance 222 via a native application 216 running on client operating system 214. The native application 216 is an example of an application accessible by the client system without necessarily communicating over a network. For example, the native application 216 may be configured to perform data processing and/or data hosting operations when executed by a processor, and can be configured to provide data to workflows developed with reference to metadata content. As some examples, the native application 216 can be any type of local application or service, such as a database application (e.g., QuickBooks®, a Microsoft® Excel® spreadsheet), an e-mail application (e.g., Microsoft® Outlook®), a productivity application (e.g., Microsoft® Word®, Microsoft® PowerPoint®, etc.), or another type of application. Although FIG. 2A shows a single local application, any number of local applications may be present in the client system.

Typically electronic content file data or content includes file content (a data stream), as well as corresponding file metadata that can include file name, timestamps, attributes, etc. In some implementations, the first client system 210 can receive, modify, or otherwise access this information about the collaborative document by way of a manifest service 234. The manifest service 234 can communicate with a uniform resource identifier (URI) or metadata identifier store 224 of the metadata service 240 to determine the appropriate identifiers to include with each collaborative document. One or more URIs can be linked with the synced document via the manifest service 234 so that synchronization sessions of the collaborative document with other client systems will include the appropriate and up to date metadata identifiers. In cases where the first user 202 provides an input that makes reference to the document metadata or otherwise initiates a call to action for metadata-based activities, the URI(s) associated with the local document can be triggered, activated, or executed to request information and/or actions from metadata service 240. The metadata service 240 can receive the request from the first client system 210 via a metadata API 244, which is configured to receive and/or share information with the client system. In response, the metadata API 244 can communicate or otherwise display, via network 232, a local metadata interface module 242 to the first user 202 on the first client system 210. In some implementations, the metadata API 244 can also be understood to comprise a REST API.

Furthermore, in some implementations, the local metadata interface module 242 can generate and/or transmit for display on the client system a user interface through which the user can view and interact with the metadata-based activities for the selected document. In some implementations, the metadata API 244 can be configured to be operated/interacted with to create additional applications in the form of workflows, as described above. For instance, a user may access metadata API 244 by interacting with the local instance 222 via the native application 216 that is capable of accessing a network-based application. Through a selection of tasks or options in the document that were linked with the URI, a user may be provided with a browser to traverse a network address (e.g., a uniform resource locator) which can access metadata API 244 and which in turn can invoke one or more workflow designer GUIs (e.g., a web page) in a browser window or a workflow review/manager, or any other metadata-based options. The user is then enabled to interact with the workflow designer GUI or manager to develop a workflow or respond to previously developed workflows.

In some implementations, metadata API 244 can include or connect with a UI generator and/or a workflow logic generator. The UI generator may be is configured to transmit workflow GUI information (e.g., one or more web pages, image content, etc.) to a browser in order to be displayed as workflow designer GUI within the browser window in a display screen for the client system. The workflow designer GUI may then be interacted with by a user to select and configure workflow steps into a workflow. For example, the user may insert and sequence a plurality of workflow steps in the workflow designer GUI, with one or more of the steps being associated with a local or network-based application. The browser can be configured to stores the selected workflow steps, corresponding configuration information, and/or workflow step sequence information as constructed workflow information. In one implementation, any inputs made via the interface can be processed by the metadata API 244, and recorded in the collaborative document metadata store 248.

Referring next to FIG. 2B, a simplified example of a process of implementing the system of FIG. 2A is schematically presented. Some system modules are illustrated near the top of the drawing, and a series of events are arranged below. Generally, it can be seen that the events shown in the lower part of the drawing are connected by dotted line to a module that is relevant to the initiation of the designated event. It should be understood that the steps described are for purposes of simplicity, and other steps may also be included, or some of these steps may be omitted.

In a first step 260, the metadata service 240 can register a URI and provide the URI to the document repository 250. The manifest service 234 can obtain the URI information from the document repository 250 and submit the information to the sync service 230 in a second step 262. The sync client 212 can be configured to synchronize data on the client system 210 with data associated with the sync service 230 in a third step 264, including the URI for the electronic content. In some implementations, the URI may be synced with the electronic content (e.g., both are synced as a package), while in other implementations the electronic content can be synced in separate process or time from its corresponding URI.

As the user interacts with the native application 216 on the client system 210, a first user input may be received that can trigger the presentation of a menu or other actuatable option in a fourth step 266. The menu provides the user with one or more options that can be identified or configured by invocation of a menu handler, as in an optional fifth step 268. In a sixth step 270, in response to a second user input requesting a task associated with the document metadata, the sync client 212 can request manifest data from the manifest service 234, based on the URI that was associated with the selected document. The manifest service 234, in a seventh step 272, can transmit this data, which is received by the sync client 212. In an eighth step 274, the sync client 212 can present new options (action menu items) in conjunction with the menu handler for the user to engage in tasks that utilize collaborative metadata for the document.

The user can then choose an option in a ninth step 276, and this third input can trigger a request from the sync client 212 to the metadata service 240 in a tenth step 278 for deploying a local interface. The metadata service 240 can respond to the request by providing the necessary data to generate the local interface on the client system 210 in an eleventh step 280. As the user continues now to interact with the metadata options via the local metadata interface 242 being presented on the client device, various actions can be performed in conjunction with the remotely stored metadata and metadata API 244 in a twelfth step 282.

Figure 3:
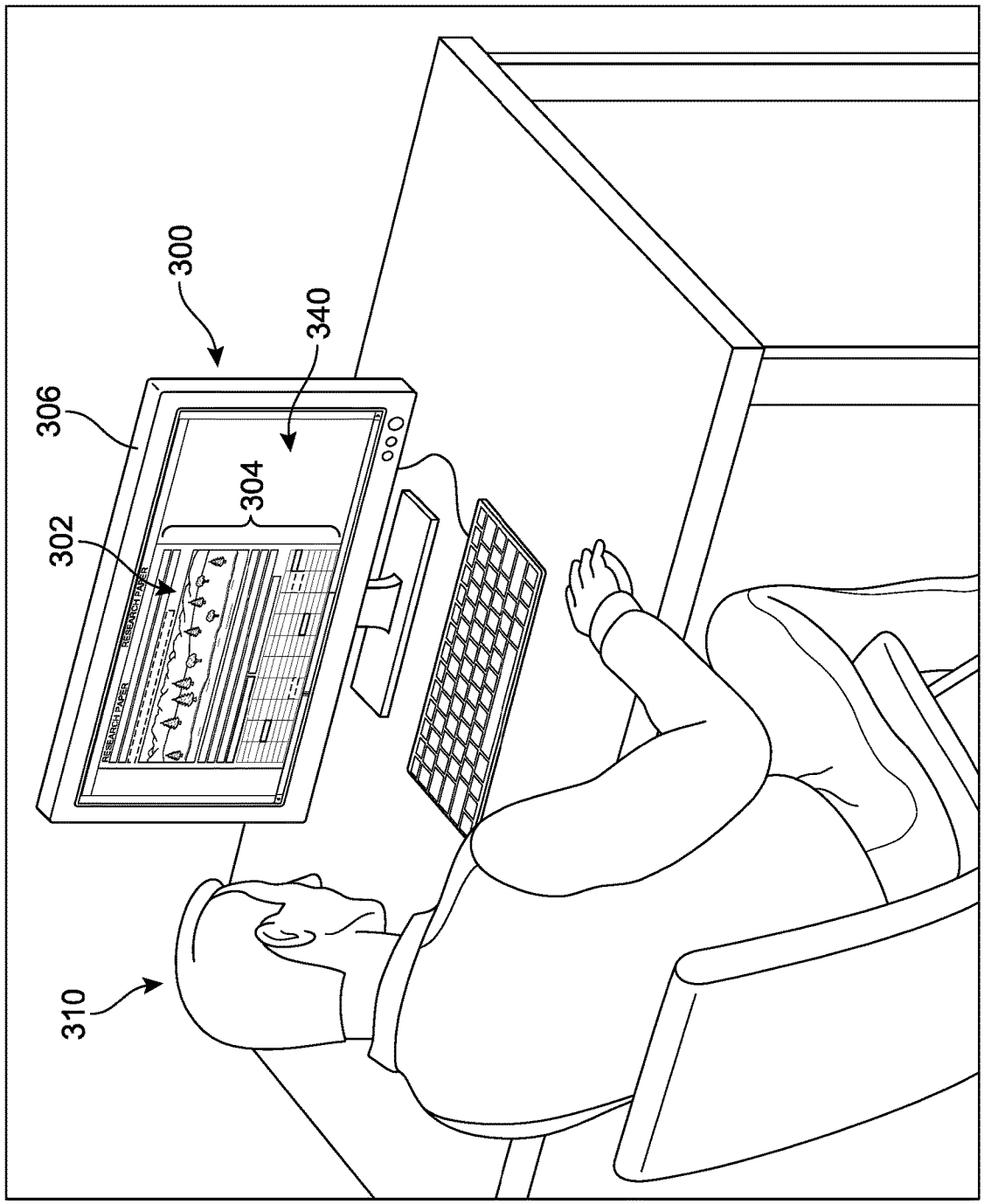
FIG. 3 is a representation of a device display with an implementation of a document opened on a client device following access via a synchronization client application.

For purpose of clarity for the reader, FIGS. 3-6 present an example of some user interfaces by which metadata content may be accessed and/or presented. In FIG. 3, a second user 310 is shown accessing a second electronic content item ("document") 302 via a second computing device ("second device") 300. When the second user 310 opens the document 302 via a native application 340, a document content 304 can be presented on a display 306.

In different implementations, the display 306 may be configured to present various icons, interfaces, graphics, applications, or other device status information. As an example, the display 306 includes an implementation of an interface for the opening or accessing of a file associated with native application 340. For purposes of simplicity, the native application 340 in FIG. 3 is a word processor program displaying a portion of document 304. In one implementation, native application 340 may be understood to represent a version of Microsoft Word®, or another word processing program, such as Apple Pages®, Corel WordPerfect®, Google Docs®, IBM Lotus Word Pro® and other word editing programs. However, in other implementations, the native application 340 may include any other software applications within the Microsoft Office Suite® or array of Microsoft® products, as well as any non-Microsoft® based applications.

In general, an "interface" can be understood to refer to a mechanism for communicating content through a native application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" may refer to an event (or specific sequence of events) associated with a particular input or use of an application via an interface, which can trigger a change in the display of the application.

In addition, a "native control" generally refers to a mechanism for communicating content through a native application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" as an example refers to content that may be presented in association with a native control in a native application. Thus, as non-limiting examples, an asset may include text in an actuatable pop-up window, audio associated with the interactive click of a button or other native application object, video associated with a teaching user interface, or other such information presentation.

Figure 4:
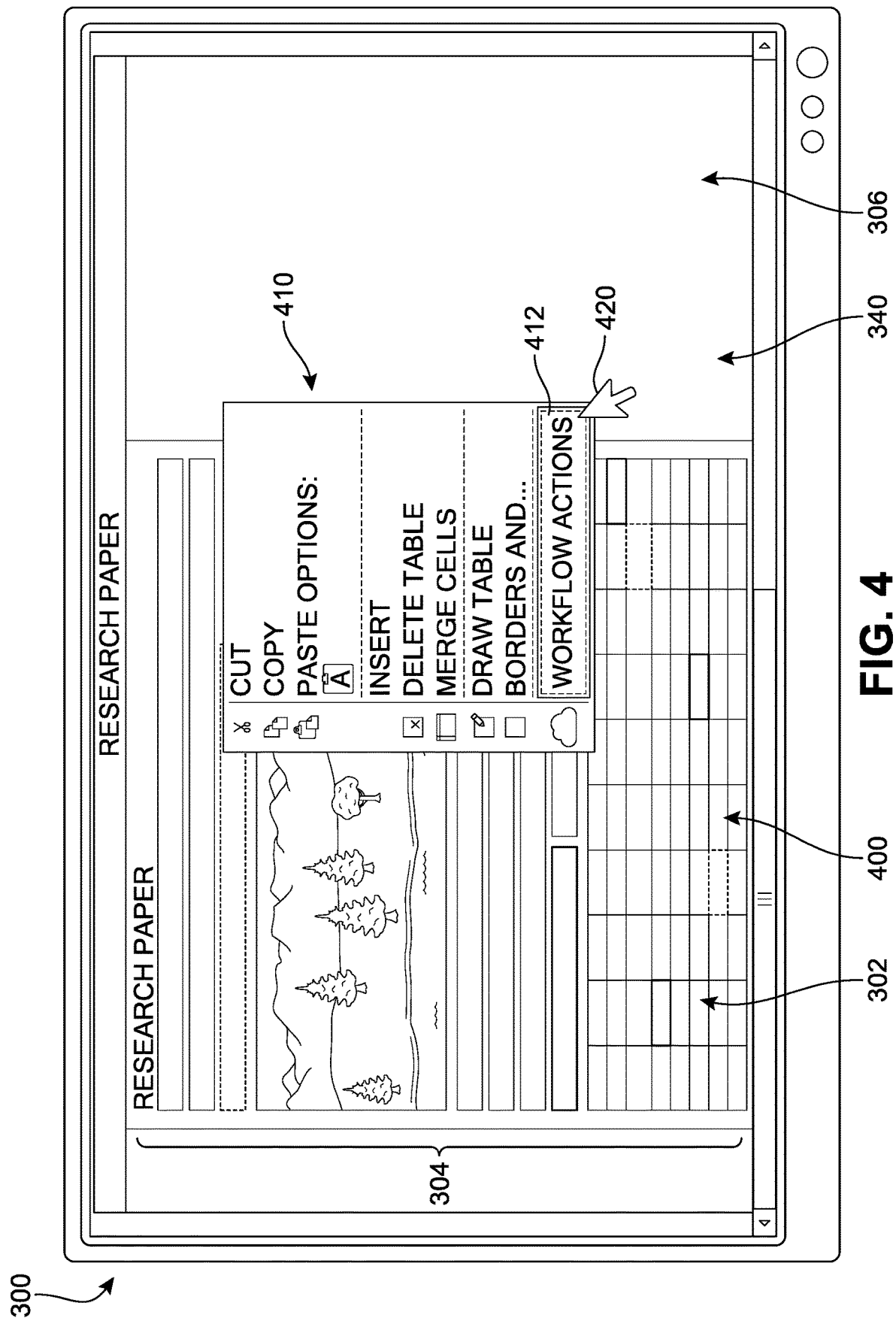
FIG. 4 is a representation of a device display with an implementation of a native application providing access to a document file and a primary options menu.

Once a user accesses the native application 340, they may be able to view available documents, basic information about these documents, and/or options or tools that can be used in association with the documents or application. In some implementations, referring next to FIG. 4, the system can receive a user input that elicits a response in the form of a menu interface that can offer users the ability to call on options related to or associated with the document metadata. In FIG. 4, a simplified view of an implementation of the display 306 is presented in conjunction with the user access of second item 302, identified in this case by a file named "Research Paper". The file name and contents are presented within a document content interface ("document interface") 400 of the application that is included in the display window. In some implementations, a user can submit a first input (represented by a mouse cursor 420) and, in response, a new window or menu interface 410 (or "menu item") can be presented. The first input can range widely, and can include clicking, hovering, or otherwise issuing a command or instructions via the document interface 400.

In some implementations, the menu interface 410 can be positioned or located adjacent or proximate to, 'over', or outside of the document interface 400, or may extend outward from the document interface 400. The menu interface 410 can be configured to display or present various options by which a user may navigate through the application and/or identify tools for facilitating document interactions. In different implementations, the menu interface 410 shown in FIG. 4 may differ, and can include varying additional or alternate options for and/or details about the document being currently viewed. In the example of FIG. 4, the menu interface 410 offers a listing of actuatable options or tools by which a user may choose to print, save, share, close, etc. the application and/or currently accessed document. In one implementation, the menu interface can include a cascading-type menu interface that, when selected, is configured to display or otherwise offer submenus or additional options. These additional options can be presented off to one side of the first 'main' menu, as one example, or can be presented elsewhere on the display. In some implementations, such cascading menu interfaces can be configured to show different submenus or options in response to the item selected in the interface.

As described earlier, in different implementations, the system can include provisions for facilitating access (e.g., via the locally run native application) to metadata content for the document that is stored remotely (e.g., not on the client device). In this example, the menu interface 410 presents plurality of options, including a menu option 412, here shown near the bottom of the menu interface 410. In other implementations, this menu option 412 can be presented in isolation (i.e., without the remaining menu options), can be offered as a drop-down menu option, and/or can be viewed via the initial native application start-up pane.

Furthermore, while the menu option 412 is labeled "Workflow Options" in FIG. 4, it should be understood that in other implementations, metadata content access option(s) can be associated with any other label, including icons, symbols, alphanumeric characters, or other indicators, and/or there may be several metadata-related options provided.

Figure 5:
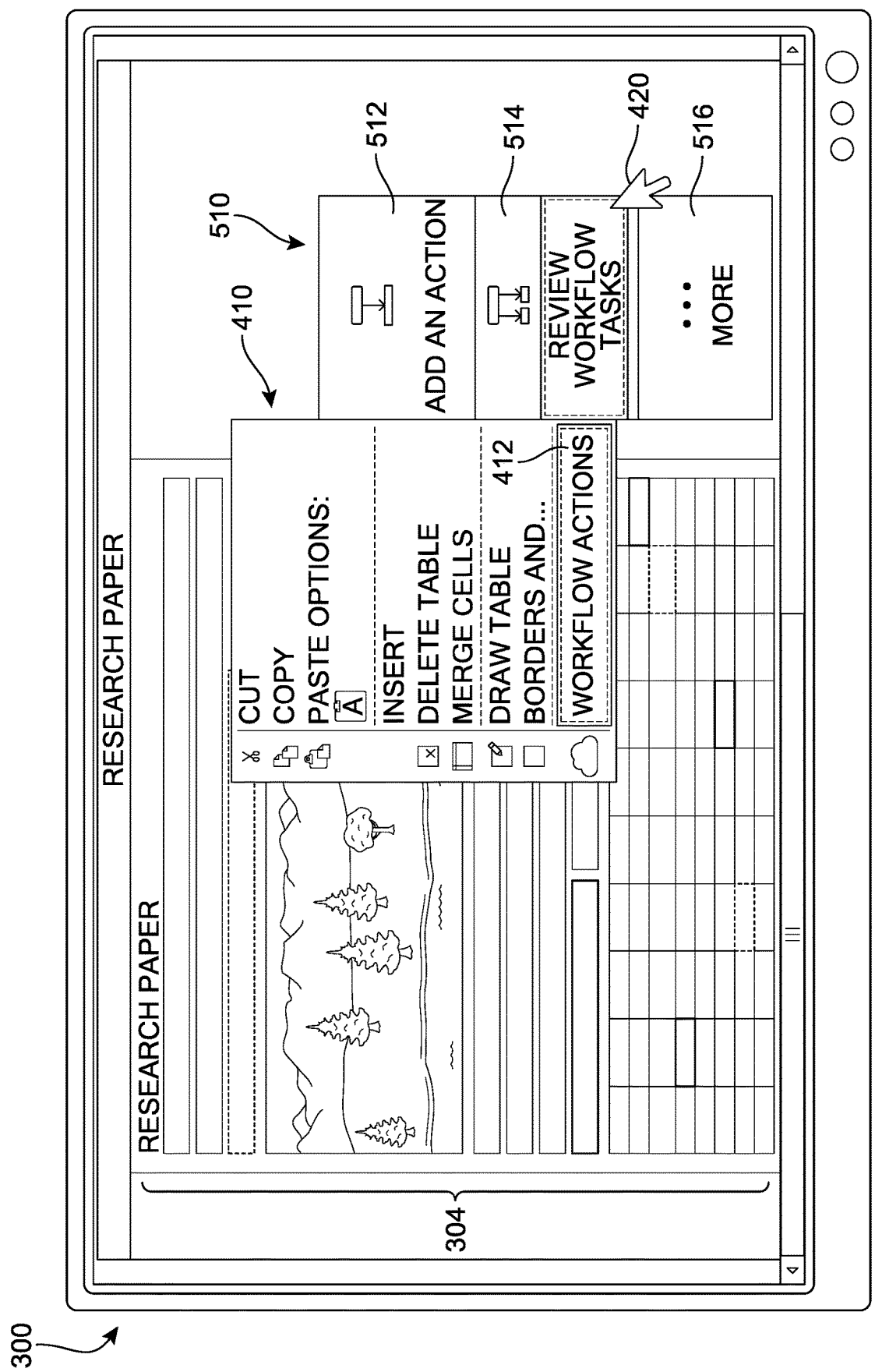
FIG. 5 is a representation of a device display with an implementation of a native application providing access to a document file and a secondary options menu.

As shown next in FIG. 5, the menu option 412, when selected, can elicit a response from the system. In some implementations, the system can respond to the selection of the menu option 412 with a presentation of an (optional) metadata options interface 510 that can provide users with a more specialized range of actions that may be performed in conjunction with the available metadata content. Thus, in some implementations, the metadata options interface 510 can offer a plurality of actuatable options for initiation of a variety of tasks that employ or rely on the metadata content in some manner in order to be executed while remaining "in" the context or environment of the native application 340. As an example, the metadata options interface 510 includes a first option 512, a second option 514, and a third option 516. The first option 512 offers the capability to "Add an Action" to the document (or the document workflow), the second option 514 ("Review Workflow Tasks") offers the capability to view actions that have been added to the document previously and/or by other collaborators of the document, and the third option 516 offers the capability of viewing or accessing additional options relevant to the document workflow or that employ document metadata. The metadata options interface 510 is shown for illustrative purposes only, and any other type of interface or options may be offered or presented to the user in response to a triggering event. In some implementations, the metadata options interface 510 may not be shown, and selection of the menu option 412 can lead directly to an arrangement similar to that described with reference to FIG. 6.

In some other implementations, the menu option 412 can be linked or otherwise associated with a Uniform Resource Identifier (URI) that a native application may utilize to access file data, as discussed above with reference to FIGS. 2A and 2B. In one example, the URI may be a Uniform Resource Locator (URL). In some implementations, the native application can be configured to contact the URL to obtain or otherwise access the metadata content for the current file, which may be hosted at a separate service. The native application 340 can also be configured to automatically determine, based in part on the protocol associated with the option and document, which data transport mechanism to use. In other words, the native application 340 and/or synchronized document protocol can provide an indication of how to properly use the URL.

In different implementations, in response to a selection of an option associated with the document metadata, the native application, in conjunction with the CMS, can trigger execution of a 'routing action' or other navigation process. In other words, in response to a user input, the system can route the recipient to a pre-defined destination in order to receive, store, and/or share metadata-based information resulting from the selection of the actionable option, and/or guide the recipient through a workflow process.

Figure 6:
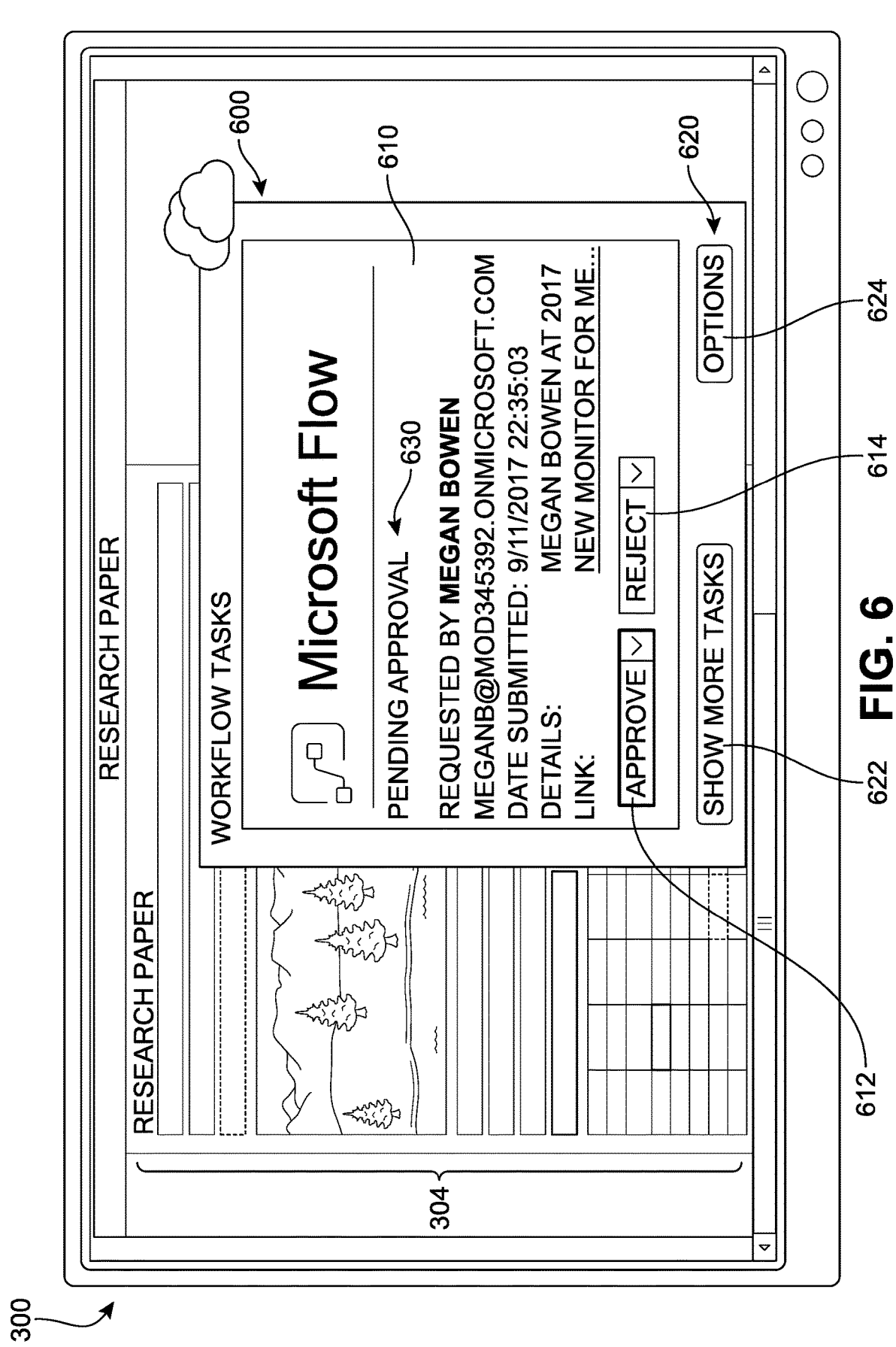
FIG. 6 is a representation of a device display with an implementation of a web-based interface providing access to metadata for the document accessed by the native application.

In FIG. 6, a metadata content interface 600 has been rendered and displayed for the second user at least in part via resources associated with the CMS. Thus, it can be seen that in addition to the original document content 'layer' (viewed via the native application 340) for the electronic content item itself, a second, metadata content layer (here presented as metadata content interface 600) is also displayed. The metadata content interface 600 can include any content that has any type of relationship with the metadata for the currently viewed or selected document. In this case, the metadata content interface 600 is presented to the user in the form of a plurality of native controls or actionable options 620 that are displayed within a general context associated with the previously selected option ("Review workflow tasks"). The metadata content interface 600 in this example includes a primary viewing pane 610 in which the task, action, or process triggered by the previous user input can be manifested. Thus, in some implementations, the access of remotely-stored metadata content includes rendering of a new layer of content outside of or external to the native application (e.g., a web browser invoked with a URL or a map application invoked with an address, or other new interface windows).

It should be noted that in some other implementations, the client device resources can be configured to interpret the URL such that the rendering occurs within the native application itself. In one implementation, the metadata content layer can be generated or displayed in various modes, such as overlay (floating above the electronic content), replace (floating above particular portions of the electronic content, thereby "hiding" the content), side panel (present in a side panel adjacent to the electronic content, possibly in the form of a small preview that can be interacted with), and margin (present in a margin area of the electronic content, possibly in the form of a very limited preview).

If a user clicks or otherwise selects one of the actionable options 620, various processes can be initiated in conjunction with the CMS and/or native application that can access or modify metadata content. For example, referring to FIG. 6, a first task 630, indicating that the present document requires approval, along with information about the approval task, is being shown in the primary viewing pane 610. In addition, a first action 612 ("Approve") and a second action 614 ("Reject") are provided, allowing the user to respond quickly and efficiently to the requested task. In some implementations, additional tasks may be associated with the document, and may also or alternatively be shown. In one implementation, a user may select a "Show More Tasks" button 622 for example, to view other workflow options or events that have occurred for this document. In another implementation, the metadata content interface 600 can offer additional features, as represented by an "Options" button 624. Additional or alternate actions may occur as the user continues to provide inputs to the system. In some implementations, in response to a selection of an actionable option by the user, additional interfaces or webpages can open on the same computing device for managing the user's interactions with the metadata content and corresponding processes. Thus, it can be seen that in some implementations, the system can be configured to initiate or perform processes that involve multiple steps and/or applications, receive and process inputs from a variety of local and remote sources, and/or integrate information occurring at different points in time to provide a seamless user experience. As the user interacts with the metadata content layer and engages in any subsequent steps, in different implementations, the system can be optionally configured to update the metadata for the document and/or, in some cases, update the document content itself. In addition, in some implementations, the CMS can present automatic messages guiding the user toward the desired task(s).

Figure 7:
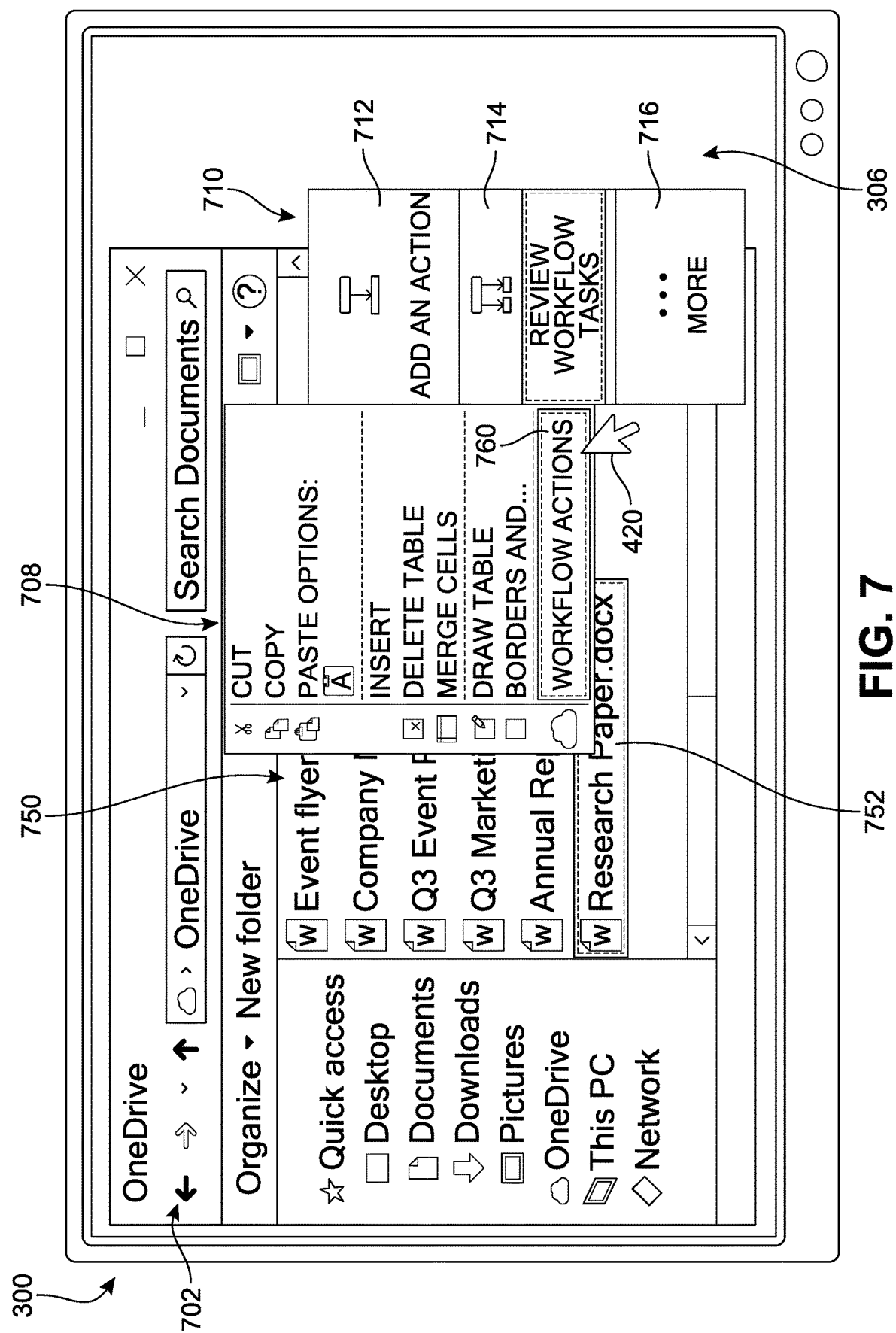
FIG. 7 is a representation of a device display with an implementation of a client folder providing access to metadata options for a document.
Figure 8:
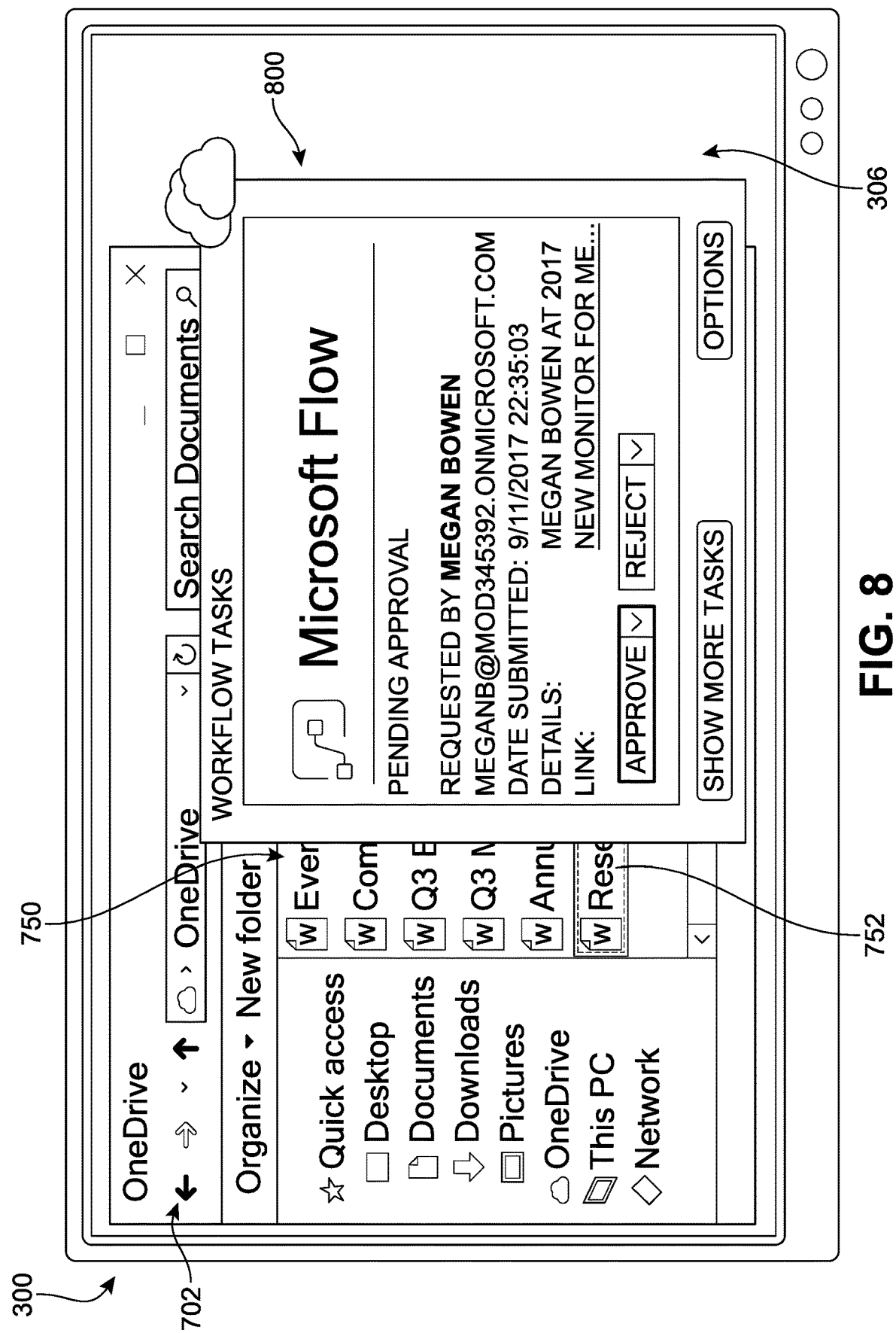
FIG. 8 is a representation of a device display with an implementation of a web-based interface providing access to metadata for the document selected in FIG. 7.

For purposes of illustration, another implementation by which the system can facilitate access to remote metadata content for an electronic content item is shown with reference to FIGS. 7 and 8. In FIG. 7, device display 306 presents an interface for a synchronization client application 702. For purposes of simplicity, the synchronization client application 702 in FIG. 7 includes a user interface shown here as a synchronization folder 750 (labeled 'OneDrive'), which presents an electronic content directory ("directory") of items currently stored on the client device. In other implementations, the synchronization client application 702 may include any other user interface or display means configured to facilitate synchronization of electronic content.

In some cases, the synchronization client application 702 can be configured to synchronize any changes to content in its designated folder and its sub-folders, such as new, deleted, modified, copied, or moved files or folders. In different implementations, the synchronization client application 702 can be a separate software application, and/or can integrate with an existing content management application in the operating system. FIG. 7 presents one example of client software that is integrated with an existing content management application such that a user is able to manipulate content directly in a local folder (synchronization folder 750) while a background process monitors the local folder for changes and synchronizes those changes to the cloud storage. In other implementations, the background process can also identify content that has been updated and synchronize those changes to the local folder. The synchronization client application 702 can be configured to provide notifications of synchronization operations in some implementations.

In other implementations, a user may have content items stored on their client device in a location other than within the designated synchronization folder of the synchronization client application 702. For example, the user may access a content management application, such as a music or photo library, which stores the content items in a location other than the designated synchronization folder. The client device can be configured to identify the location of these content items by searching the memory of the client device for files associated with specified file extensions indicating that the file is a content item that is to be synchronized. In some other implementations, the client device can perform a complete or partial search of the client device's accessible storage, such as a local hard drive or memory stick, to identify the location of content items.

Upon identification of content items in memory, the client device can be configured to import the content items to the content management system. In some implementations, this can include creating a copy of the content items, which are then stored in a designated synchronization folder, resulting in the content items being synchronized with the content management system. In some other implementations, the content items can instead be uploaded to the content management system directly from the identified location, without copies of the content items being stored in the designated synchronization folder.

As illustrated in FIG. 7, during various user interactions with the synchronization client application 702, a user may opt to interact with the items in the synchronization folder 750. As one example, a user may select or otherwise designate an electronic content item 752 (here "Research Paper.docx") with a first input, for example via a touch screen input or left or right mouse click. In response, a new window or menu interface 708 can be presented. The user input can range widely, and can include clicking, hovering, or otherwise issuing a command or instructions via the synchronization folder 750 or other aspects of the synchronization client application 702.

In some implementations, the menu interface 708 can be positioned or located adjacent or proximate to, 'over', or outside of the synchronization folder 750, or may extend outward from the synchronization folder 750. The menu interface 708 can be configured to display or present various options by which a user may review and/or identify tools for facilitating folder and file interactions. In different implementations, the menu interface 708 shown in FIG. 7 may differ, and can include varying additional or alternate options for and/or details about the document being currently viewed. In the example of FIG. 7, the menu interface 708 offers a listing of actuatable options or tools by which a user may choose to open, share, move, delete, rename, etc. the file currently selected.

In some implementations, the menu interface 708 includes a plurality of options, including a menu option 760, here shown near the bottom of the menu interface 708. In other implementations, the menu option 760 can be presented in isolation (i.e., without the remaining menu options), can be offered as a drop-down menu option, and/or can be viewed via the initial native application start-up pane. Furthermore, while the menu option 760 is labeled "Workflow Tasks" in FIG. 7, it should be understood that in other implementations, metadata content access option(s) can be associated with any other label, including icons, symbols, alphanumeric characters, or other indicators.

As shown in FIG. 7, the menu option 760, when selected by a second user input (see mouse cursor 420), can elicit a response from the system. In some implementations, the menu option 760 can be linked or otherwise associated with a Uniform Resource Identifier (URI) that a client system may utilize to access file data, as discussed above with reference to FIGS. 2A and 2B. In one example, the URI may be a Uniform Resource Locator (URL). The native application can be configured to contact the URL to obtain the metadata content for the current file, which may be hosted at a separate service.

Furthermore, in some implementations, the system can respond to the selection of the menu option 760 with a presentation of an (optional) metadata options interface 710 that can provide users with a more specialized range of actions that may be performed in conjunction with the available metadata content. Thus, in some implementations, the metadata options interface 710 can offer a plurality of actuatable options for initiation of a variety of tasks that employ or rely on the metadata content in some manner in order to be executed while remaining "in" the context or environment of the client system. As an example, the metadata options interface 710 includes a first option 712, a second option 714, and a third option 716, similar to those discussed above with respect to FIG. 5. The metadata options interface 710 is shown for illustrative purposes only, and any other type of interface or options may be offered or presented to the user in response to a triggering event. In some implementations, the metadata options interface 710 may not be shown, and selection of the menu option 760 can lead directly to an arrangement similar to that described with reference to FIG. 8.

In different implementations, in response to a selection of an option associated with the document metadata, the native application, in conjunction with the CMS, can trigger execution of a 'routing action' or other navigation process. In other words, in response to a user input, the system can route the recipient to a pre-defined destination in order to receive, store, and/or share metadata-based information resulting from the selection of the actionable option, and/or guide the recipient through a corresponding process.

In FIG. 8, a metadata content interface 800 has been rendered and displayed for the second user at least in part via resources associated with the CMS. Thus, it can be seen that in addition to the previous folder contents associated with the electronic content item itself, a metadata content layer (here presented as metadata content interface 800) is also manifested. In other words, users can access metadata-based options for a file without requiring the opening of the file itself via a native application. The metadata content interface 800 can include the display of any content that has any type of relationship with the metadata for the currently viewed or selected document. In this case, the metadata content interface 800 is presented to the user can be understood to be similar to that described with reference to FIG. 6.

Figure 9:
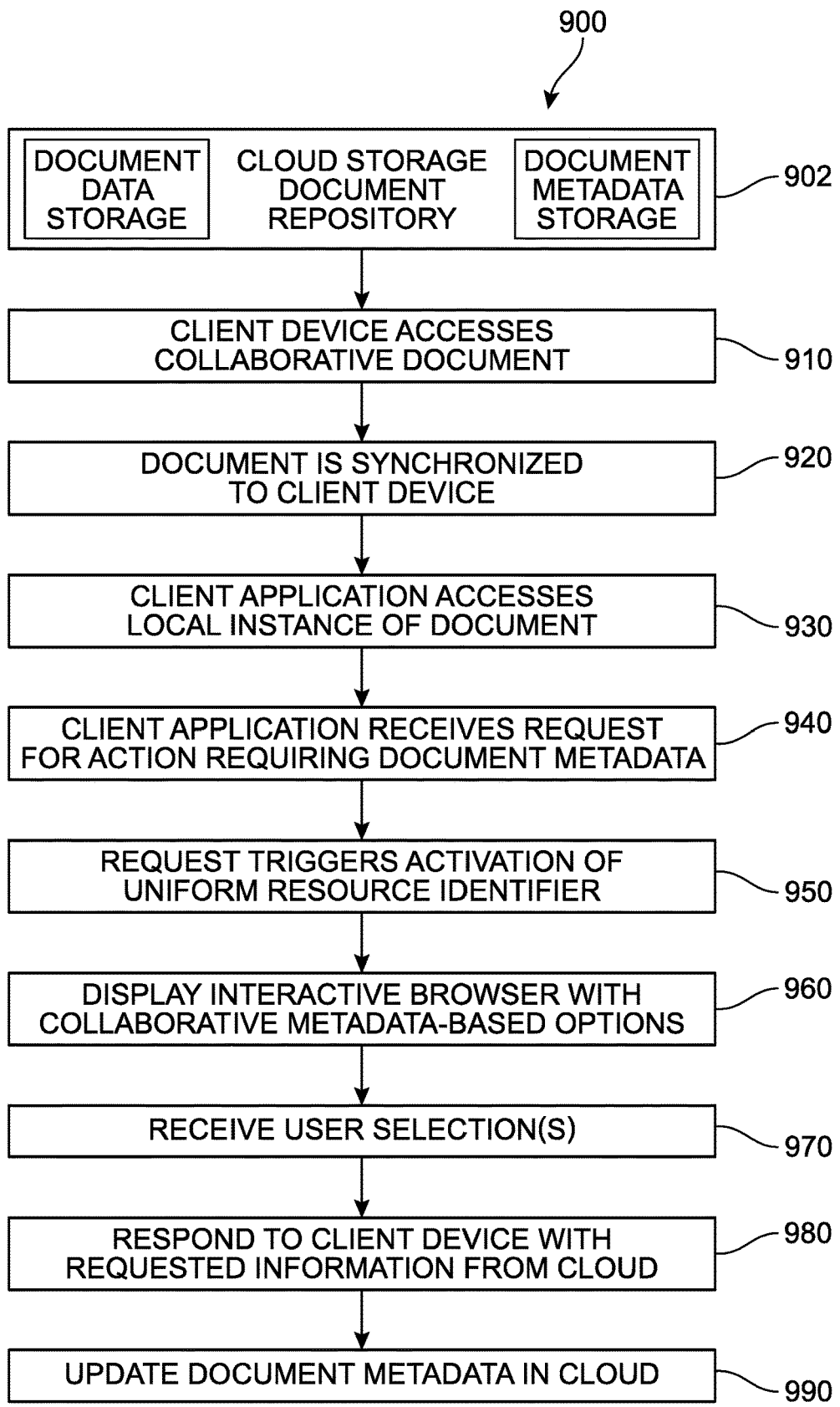
FIG. 9 is a process flow diagram of an implementation for a method of accessing remote metadata for an electronic content item.

For purposes of clarity, FIG. 9 illustrates one implementation of a process 900 for providing remote metadata content for a document to a local client device (e.g., via a content management system). In this example, a first stage 910 includes the synchronization and/or access of the collaborative document, for example from a cloud storage document repository 902. As described earlier, in some implementations, the repository can include various modules for identifying and routing different types of data. In this example, the repository includes document data storage and a corresponding document metadata storage. The collaborative document can be synced with a client synchronization application in a second stage 920, and this local copy of the document may be accessed by the user in a third stage 930.

In addition, in some implementations, the native application can receive a user input that corresponds to a request for some action or process that requires or makes reference to metadata for the document (fourth stage 940). This request can trigger an activation or execution of an identifier (e.g., URI) in a fifth stage 950. The URI can route the request to a remote location that is configured to interact and communicate with the client device. For example, an interactive browser or other interface can be displayed on the client device in a sixth stage 960, offering the user one or more options for navigating through the selected process or task in a seventh stage 970. In response to the selection(s), the CMS can provide or otherwise continue to provide additional options for working with the document metadata in an eighth stage 980. In some implementations, the user may provide inputs or make other changes that will be recorded in the system as ninth stage 990.

Figure 10:
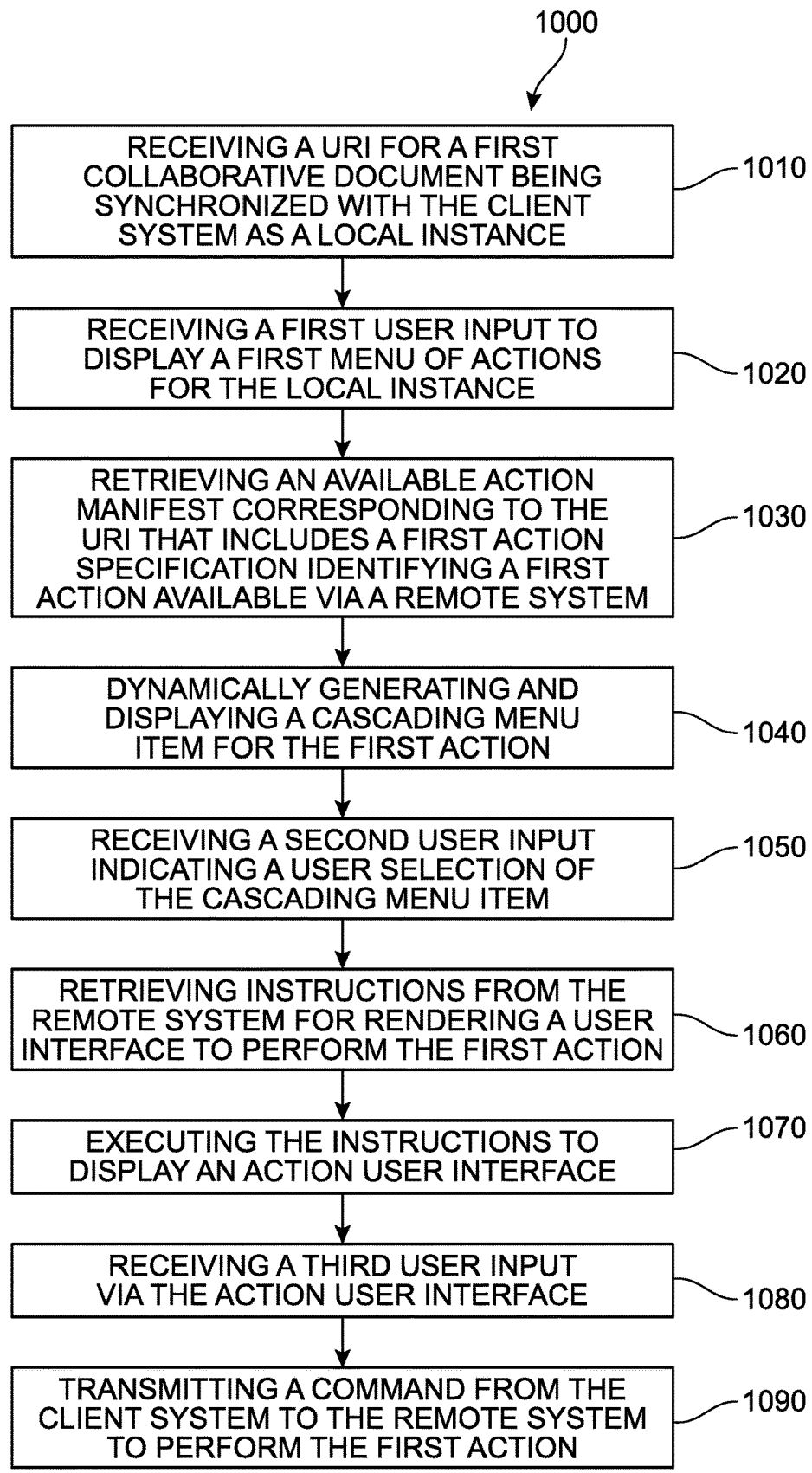
FIG. 10 is a flow diagram illustrating an implementation of a process for providing a client device access to remote metadata.

FIG. 10 is a flow chart illustrating an implementation of a method 1000 for accessing collaborative document actions. In FIG. 10, a first step 1010 includes receiving, at a first client system, a first uniform resource identifier (URI) associated with a first collaborative document being synchronized with the first client system, and a second step 1020 of receiving, via a native application executing on the first client system in connection with a local instance of the first collaborative document, a first user input to display a first menu of actions for the local instance. In a third step 1030, the method includes retrieving, via a network and in response to the first user input, a first available action manifest corresponding to the first URI, where the first available action manifest includes a first action specification identifying a first collaborative document action available via a remote system. A fourth step 1040 involves dynamically generating, in response to retrieving the first available action manifest, a menu item (cascading or otherwise) for the first collaborative document action and displaying the menu item with the first menu, and a fifth step 1050 includes receiving a second user input indicating a user selection of the menu item. In addition, the method includes a sixth step 1060 of retrieving, in response to the second user input and based on the first action specification, first instructions from the remote system for rendering a user interface to perform the first collaborative document action for the first collaborative document, and a seventh step 1070 of executing the first instructions to display an action user interface on the first client system for the first collaborative document. Furthermore, the method includes an eighth step 1080 of receiving a third user input via the action user interface, and a ninth step 1090 of transmitting a command, in response to the third user input, from the first client system to the remote system to perform the first collaborative document action on the first collaborative document.

In other implementations, the method can include additional or alternate steps or aspects. For example, the local instance of the first collaborative document may be stored at the first client system in a file system, the native application is a file explorer application configured to render a user interface for navigating files stored in the file system and selecting files stored in the file system, and the first user input is received with respect to a user interface element representing the local instance of the first collaborative document. In some cases, the first user input includes a right-click action performed on the user interface element. In another example, the native application is an authoring application configured to, at the first client system, render in an authoring user interface an electronic content item stored in the local instance of the first collaborative document, and the first user input is received via the authoring user interface. In some other implementations, the action user interface can present a workflow task form. In such cases, the workflow task form may include a plurality of actuatable options for modifying metadata that is associated with the first collaborative document. Thus, in response to a selection by a user or other user input, the system can be configured to display one or more pre-defined/designed/created or pre-selected forms or interfaces that serve as a template for the user to interact with various workflows or other metadata options.

As another example, the action user interface can be configured to display a metadata item associated with the first collaborative document, and the command specifies an edit to the metadata item to be performed by the remote system. Furthermore, in different implementations, the method can also include a step of receiving, at a second client system, a second URI associated with the first collaborative document being synchronized with the second client system, where the second URI differs from the first URI. In another example, the method can include retrieving, via the network, a second available action manifest corresponding to the second URI, where the second available action manifest differs from the first available action manifest. In some implementations, the method further includes modifying the first action specification, in response to the third user input, to include a second collaborative document action available via the remote system. In some cases, the method may further include updating the first available action manifest in response to any edits to the metadata item.

Previously, local copies for enterprise content would be synchronized along with their metadata and a local delivered interface for accessing document metadata. However, the scale and complexity of enterprise content made this process unwieldy, and often resulted in local copies of files "losing" their connection to enterprise metadata repositories. Users found in context viewing and editing impossible, necessitating those experiences to occur via the direct portal interface while temporally disconnected form the local editing session. In the implementations described herein, documents that have been synced to a local machine can "discover" content management capabilities associated with the documents, which can significantly improve efficient usage of computing resources. In addition, this process works in cooperation with client systems, so that native applications that open synced files can help ensure the metadata-guided behaviors remain enforced. As a synchronization session occurs, synced documents can be bundled together with a URL as described herein to access content management capability services while the file is being opened on a local machine. Thus, authoring applications can retrieve content management capabilities from that URL, such as metadata, a document's template, a document's expiration date, information regarding any running workflows on the item, whether the document has been flagged for review, or flagged for violation of one of the parent organization's data policies, or other such information about the document. Through the use of this system, users can continue to reliably access and maintain synchronized copies of a file that are also stamped with the URL that readily connects the client system to a cloud delivered interface for displaying and editing document metadata. By means of local system operating system registration and a user request for more information about a local copy of a file (e.g. a right mouse click) that opens up a contextual menu, users can view and edit enterprise metadata about a document from the local system, with the files interface streamed at runtime to the local OS.

Implementations of the present disclosure can make use of any of the features, systems, components, devices, and methods described in U.S. Patent Publication Number 2017/0316355 to Shrestha et al., published Nov. 2, 2017 and titled "Lazy generation of templates"; U.S. Patent Publication Number 20170286547 to Acosta et al., published Oct. 5, 2017 and titled "Using relevant objects to add content to a collaborative repository"; U.S. Patent Publication Number 2017/0147296 to Kumar et al., published May 25, 2017 and titled "Workflow development system with ease-of-use features"; U.S. Patent Publication Number 2018/0300304 to Mullins et al., published Oct. 18, 2018 and titled "Collaborative review workflow graph"; U.S. Patent Publication Number 2017/0017551 to Nichols et al., published Jan. 19, 2017 and titled "Coordinating file synchronization between a sync engine and another application that supports document collaboration"; U.S. Patent Publication Number 2017/0269805 to DeMaris et al., published Sep. 21, 2017 and titled "File workflow board"; U.S. Patent Publication Number 2018/0165263 to Mullins et al., published Jun. 14, 2018 and titled "Automatically or semi-automatically adapting feedback received on a document"; U.S. Patent Publication Number 2006/0069596 to Hatoun et al., published Mar. 30, 2006 and titled "Workflow hosting computing system using a collaborative application"; U.S. Patent Publication Number 2006/0069599 to Hatoun et al., published Mar. 30, 2006 and titled "Workflow tasks in a collaborative application"; U.S. Patent Publication Number 2006/0069605 to Hatoun et al., published Mar. 30, 2006 and titled "Workflow association in a collaborative application"; U.S. Patent Publication Number 2010/0299170 to Savescu et al., published Nov. 25, 2010 and titled "Stages, phases in a project workflow"; U.S. Patent Publication Number 2017/0149906 to DeMaris et al., published May 25, 2017 and titled "Private editing of shared files"; U.S. Patent Publication Number 2017/0285901 to DeMaris et al., published Oct. 5, 2017 and titled "Using drag and drop to apply metadata"; and U.S. Patent Publication Number 2017/0078384 to Trandafir et al., published Mar. 16, 2017 and titled "Synchronizing file data between computer systems," the disclosures of which are each herein incorporated by reference in their entirety.

The detailed examples of systems, devices, and techniques described in connection with FIGS. 1-10 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-10 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 11:
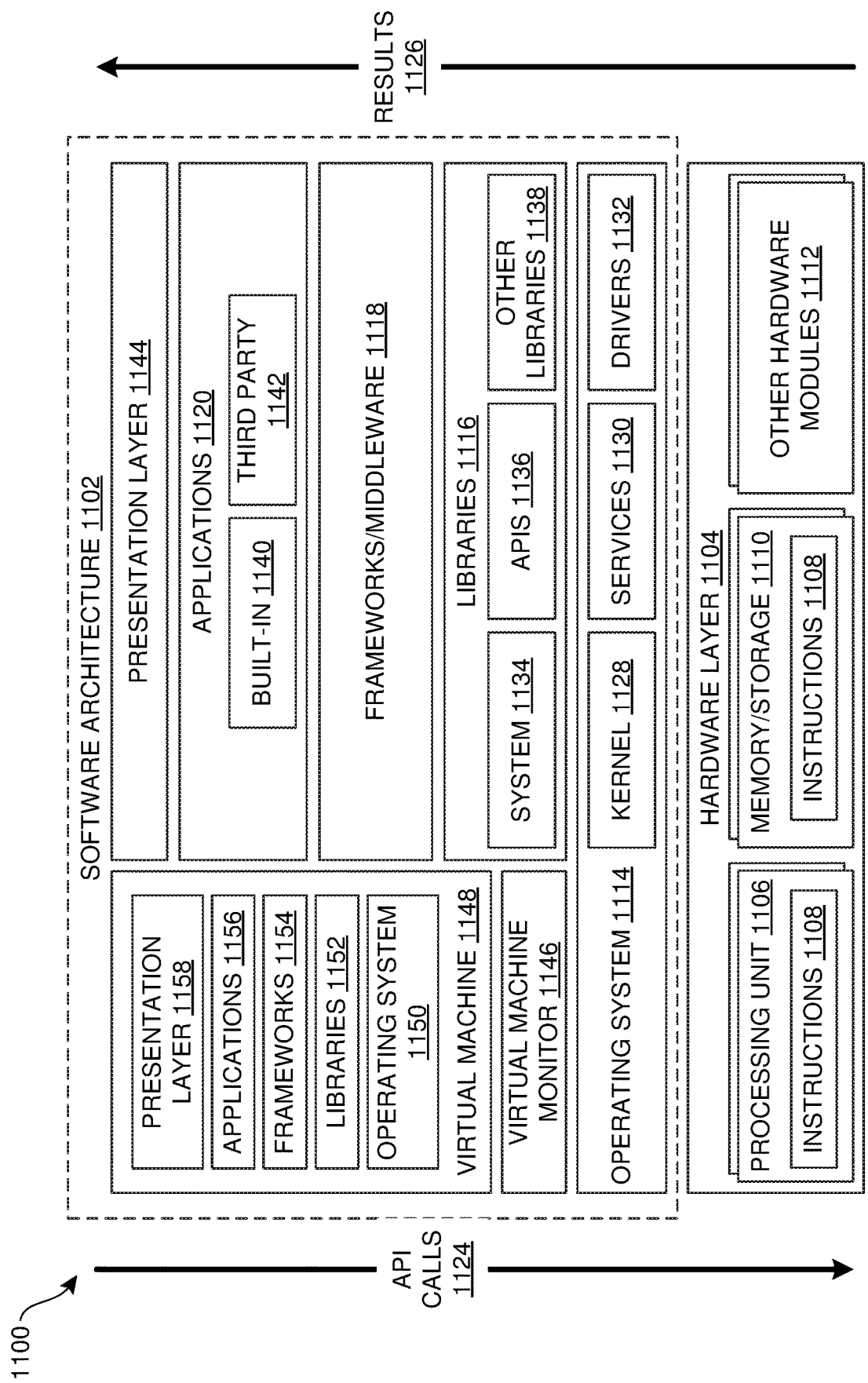
FIG. 11 is a block diagram of an example computing device, which may be used to provide implementations of the mechanisms described herein.

FIG. 11 is a block diagram 1100 illustrating an example software architecture 1102, various portions of which may be used in conjunction with various hardware architectures herein described, which may implement any of the above-described features. FIG. 11 is a non-limiting example of a software architecture and it will be appreciated that many other architectures may be implemented to facilitate the functionality described herein. The software architecture 1102 may execute on hardware such as a device 120 of FIG. 1A that includes, among other things, document storage 1070, processors, memory, and input/output (I/O) components. A representative hardware layer 1104 is illustrated and can represent, for example, the device 120 of FIG. 1. The representative hardware layer 1104 includes a processing unit 1106 and associated executable instructions 1108. The executable instructions 1108 represent executable instructions of the software architecture 1102, including implementation of the methods, modules and so forth described herein. The hardware layer 1104 also includes a memory/storage 1110, which also includes the executable instructions 1108 and accompanying data. The hardware layer 1104 may also include other hardware modules 1112. Instructions 1108 held by processing unit 1108 may be portions of instructions 1108 held by the memory/storage 1110.

The example software architecture 1102 may be conceptualized as layers, each providing various functionality. For example, the software architecture 1102 may include layers and components such as an operating system (OS) 1114, libraries 1116, frameworks 1118, applications 1120, and a presentation layer 1144. Operationally, the applications 1120 and/or other components within the layers may invoke API calls 1124 to other layers and receive corresponding results 1126. The layers illustrated are representative in nature and other software architectures may include additional or different layers. For example, some mobile or special purpose operating systems may not provide the frameworks/middleware 1118.

The OS 1114 may manage hardware resources and provide common services. The OS 1114 may include, for example, a kernel 1128, services 1130, and drivers 1132. The kernel 1128 may act as an abstraction layer between the hardware layer 1104 and other software layers. For example, the kernel 1128 may be responsible for memory management, processor management (for example, scheduling), component management, networking, security settings, and so on. The services 1130 may provide other common services for the other software layers. The drivers 1132 may be responsible for controlling or interfacing with the underlying hardware layer 1104. For instance, the drivers 1132 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1116 may provide a common infrastructure that may be used by the applications 1120 and/or other components and/or layers. The libraries 1116 typically provide functionality for use by other software modules to perform tasks, rather than rather than interacting directly with the OS 1114. The libraries 1116 may include system libraries 1134 (for example, C standard library) that may provide functions such as memory allocation, string manipulation, file operations. In addition, the libraries 1116 may include API libraries 1136 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1116 may also include a wide variety of other libraries 1138 to provide many functions for applications 1120 and other software modules.

The frameworks 1118 (also sometimes referred to as middleware) provide a higher-level common infrastructure that may be used by the applications 1120 and/or other software modules. For example, the frameworks 1118 may provide various graphic user interface (GUI) functions, high-level resource management, or high-level location services. The frameworks 1118 may provide a broad spectrum of other APIs for applications 1120 and/or other software modules.

The applications 1120 include built-in applications 1140 and/or third-party applications 1142. Examples of built-in applications 1140 may include, but are not limited to, a contacts application, a browser application, a location application, a media application, a messaging application, and/or a game application. Third-party applications 1142 may include any applications developed by an entity other than the vendor of the particular platform. The applications 1120 may use functions available via OS 1114, libraries 1116, frameworks 1118, and presentation layer 1144 to create user interfaces to interact with users.

Some software architectures use virtual machines, as illustrated by a virtual machine 1148. The virtual machine 1148 provides an execution environment where applications/modules can execute as if they were executing on a hardware machine (such as the machine 1000 of FIG. 10, for example). The virtual machine 1148 may be hosted by a host OS (for example, OS 1114) or hypervisor, and may have a virtual machine monitor 1146 which manages operation of the virtual machine 1148 and interoperation with the host operating system. A software architecture, which may be different from software architecture 1102 outside of the virtual machine, executes within the virtual machine 1148 such as an OS 1150, libraries 1152, frameworks 1154, applications 1156, and/or a presentation layer 1158.

Figure 12:
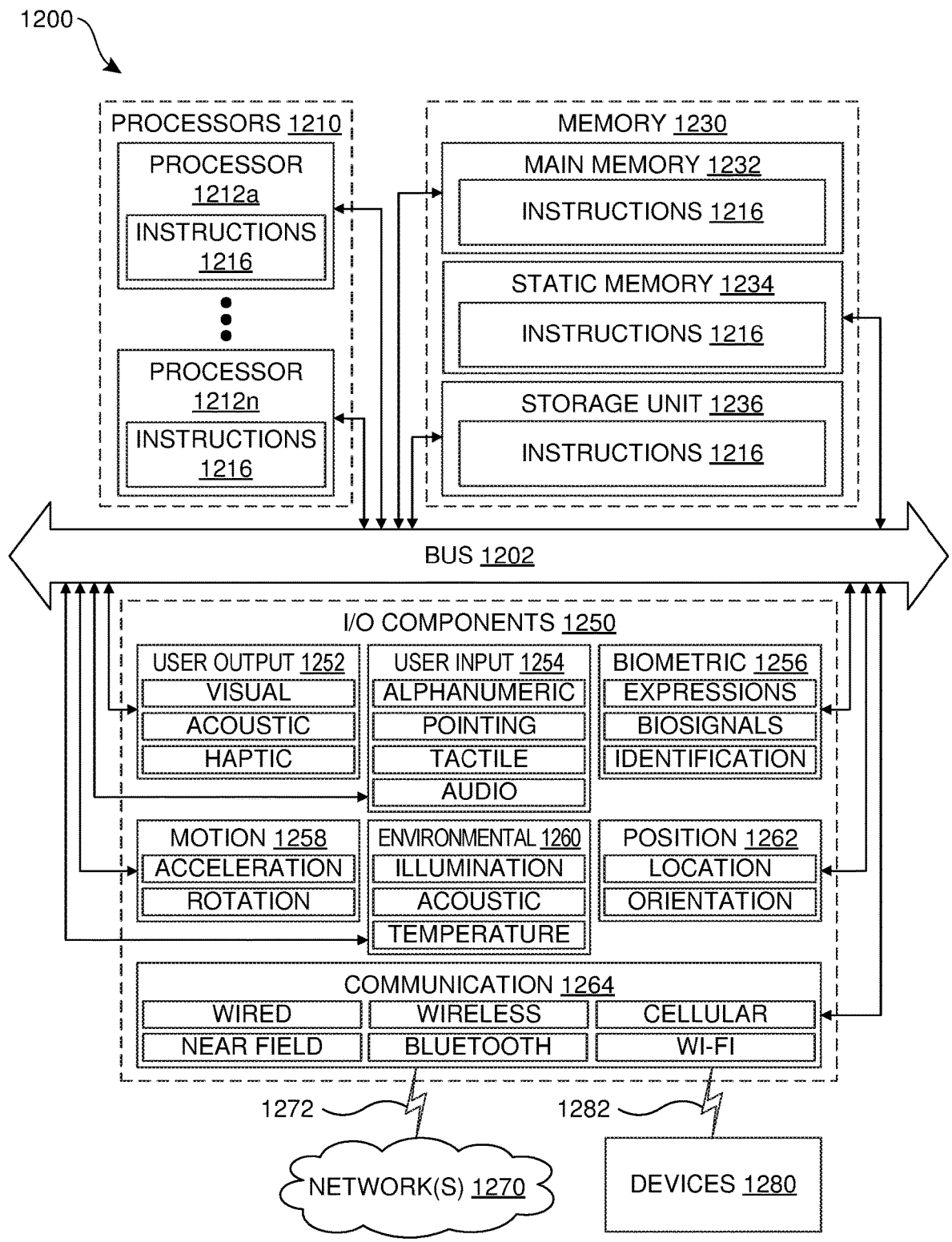
FIG. 12 is a block diagram illustrating components of an example machine configured to read instructions from a machine-readable medium.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement modules or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" include a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212a to 1212n that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, display components for displaying information (for example, a liquid crystal display (LCD) or a projector), acoustic components (for example, speakers), haptic components (for example, a vibratory motor or force-feedback device), and/or other signal generators. User input components 1254 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1250 may include biometric components 1256 and/or position components 1262, among a wide array of other environmental sensor components. The biometric components 1256 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network(s) 1270. The communication components 1264 may include, for example, components adapted to provide wired communication, wireless communication, cellular communication, Near Field Communication (NFC), Bluetooth communication, Wi-Fi, and/or communication via other modalities. The device(s) 1280 may include other machines or various peripheral devices (for example, coupled via USB).

In some examples, the communication components 1264 may detect identifiers or include components adapted to detect identifiers. For example, the communication components 1264 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1262, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:
1. A content management system for accessing collaborative document actions comprising:
 a processor; and
 computer readable media including instructions which, when executed by the processor, cause the processor to:
  receive, at a first client system, a first uniform resource identifier (URI) associated with a first collaborative document being synchronized with the first client system, wherein:

a local instance of the first collaborative document is downloaded to the first client system, the first collaborative document is associated with first collaborative metadata, and the first collaborative metadata is maintained on a remote system associated with the content management system, wherein the first collaborative metadata includes version information for the first collaborative document and information identifying collaborative document actions that may be performed on the first collaborative document;

receive, via a native application executing on the first client system in connection with the local instance of the first collaborative document, a first user input to display a first menu of actions for the local instance;

retrieve, via a network, a first available action manifest corresponding to the first URI in response to the first user input, wherein the first available action manifest includes a first action specification identifying a first collaborative document action available via the remote system, wherein the first collaborative document action is specified in the first collaborative metadata;

dynamically generate a menu item for the first collaborative document action and displaying the menu item with the first menu in response to retrieving the first available action manifest;

receive a second user input indicating a user selection of the menu item;

retrieve, in response to the second user input and based on the first action specification, first instructions from the remote system for rendering a user interface to perform the first collaborative document action for the first collaborative document;

execute the first instructions to display an action user interface on the first client system for the first collaborative document;

receive a third user input via the action user interface; and transmit a command from the first client system to the remote system to perform the first collaborative document action on the first collaborative document, in response to the third user input.

2. The system of claim 1, wherein:

the local instance of the first collaborative document is stored at the first client system in a file system;

the native application is a file explorer application configured to render a user interface for navigating files stored in the file system and selecting files stored in the file system; and the first user input is received with respect to a user interface element representing the local instance of the first collaborative document.

3. The system of claim 2, wherein the first user input is a click action performed on the user interface element.

4. The system of claim 1, wherein:

the native application is an authoring application configured to, at the first client system, render in an authoring user interface an electronic content item stored in the local instance of the first collaborative document; and the first user input is received via the authoring user interface.

5. The system of claim 1, wherein the action user interface presents a workflow task form.

6. The system of claim 1, wherein:

the action user interface is configured to display a metadata item associated with the first collaborative document; and the command specifies an edit to the metadata item to be performed by the remote system.

7. The system of claim 1, wherein the instructions further cause the processor to receive, at a second client system, a second URI associated with the first collaborative document being synchronized with the second client system, and wherein the second URI differs from the first URI.

8. The system of claim 7, wherein the instructions further cause the processor to retrieve, via the network, a second available action manifest corresponding to the second URI, wherein the second available action manifest differs from the first available action manifest.

9. The system of claim 6, further comprising updating the first available action manifest in response to the edit to the metadata item.

10. The system of claim 5, wherein the workflow task form includes a plurality of actuatable options for modifying metadata that is associated with the first collaborative document.

11. A method for accessing collaborative document actions, the method including:

receiving, at a first client system, a first uniform resource identifier (URI) associated with a first collaborative document being synchronized with the first client system, wherein:

a local instance of the first collaborative document is downloaded to the first client system, the first collaborative document is associated with first collaborative metadata, and the first collaborative metadata is maintained on a remote system associated with a content management system, wherein the collaborative metadata includes version information for the first collaborative document and information identifying collaborative document actions that may be performed on the first collaborative document;

receiving, via a native application executing on the first client system in connection with the local instance of the first collaborative document, a first user input to display a first menu of actions for the local instance;

retrieving, via a network and in response to the first user input, a first available action manifest corresponding to the first URI, wherein the first available action manifest includes a first action specification identifying a first collaborative document action available via the remote system, wherein the first collaborative document action is specified in the first collaborative metadata maintained by the content management system;

dynamically generating, in response to retrieving the first available action manifest, a menu item for the first collaborative document action and displaying the menu item with the first menu;

receiving a second user input indicating a user selection of the menu item;

retrieving, in response to the second user input and based on the first action specification, first instructions from the remote system for rendering a user interface to perform the first collaborative document action for the first collaborative document;

executing the first instructions to display an action user interface on the first client system for the first collaborative document;

receiving a third user input via the action user interface; and transmitting a command, in response to the third user input, from the first client system to the remote system to perform the first collaborative document action on the first collaborative document.

12. The method of claim 11, wherein:
the local instance of the first collaborative document is stored at the first client system in a file system;
the native application is a file explorer application configured to render a user interface for navigating files stored in the file system and selecting files stored in the file system; and
the first user input is received with respect to a user interface element representing the local instance of the first collaborative document.

13. The method of claim 12, wherein the first user input is a click action performed on the user interface element.

14. The method of claim 11, wherein:
the native application is an authoring application configured to, at the first client system, render in an authoring user interface an electronic content item stored in the local instance of the first collaborative document; and
the first user input is received via the authoring user interface.

15. The method of claim 11, wherein the action user interface presents a workflow task form.

16. The method of claim 11, wherein:
the action user interface is configured to display a metadata item associated with the first collaborative document; and
the command specifies an edit to the metadata item to be performed by the remote system.

17. The method of claim 11, further comprising receiving, at a second client system, a second URI associated with the first collaborative document being synchronized with the second client system, wherein the second URI differs from the first URI.

18. The method of claim 17, further comprising retrieving, via the network, a second available action manifest corresponding to the second URI, wherein the second available action manifest differs from the first available action manifest.

19. The method of claim 11, further comprising modifying the first action specification, in response to the third user input, to include a second collaborative document action available via the remote system.

20. The method of claim 16, further comprising updating the first available action manifest in response to the edit to the metadata item.

* * * * *